United States Patent
Ohashi et al.

(10) Patent No.: US 8,451,200 B2
(45) Date of Patent: May 28, 2013

(54) IMAGE PROCESSING APPARATUS, IMAGE PROCESSING METHOD, DISPLAY APPARATUS, AND PROJECTION DISPLAY APPARATUS

(75) Inventors: Naoki Ohashi, Kanagawa (JP); Takashi Hirakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 11/986,811

(22) Filed: Nov. 27, 2007

(65) Prior Publication Data
US 2008/0136763 A1    Jun. 12, 2008

(30) Foreign Application Priority Data
Dec. 11, 2006  (JP) ................ P2006-333576

(51) Int. Cl.
*G09G 3/36* (2006.01)
(52) U.S. Cl.
USPC .......................... 345/89; 345/690; 348/254
(58) Field of Classification Search
USPC ..... 345/89, 101, 207, 102, 690–692; 348/254
See application file for complete search history.

(56) References Cited

U.S. PATENT DOCUMENTS

| | | | | |
|---|---|---|---|---|
| 4,786,968 A | * | 11/1988 | Kutner | 348/674 |
| 5,764,216 A | * | 6/1998 | Tanaka et al. | 345/87 |
| 6,097,361 A | * | 8/2000 | Rohner | 345/87 |
| 6,380,917 B2 | * | 4/2002 | Matsueda et al. | 345/89 |
| 6,445,323 B1 | * | 9/2002 | Cairns et al. | 341/144 |
| 6,791,576 B1 | * | 9/2004 | Lin | 345/690 |
| 6,862,012 B1 | * | 3/2005 | Funakoshi et al. | 345/88 |
| 7,030,846 B2 | * | 4/2006 | Lee et al. | 345/89 |
| 7,268,913 B2 | * | 9/2007 | Murashita | 358/1.9 |
| 7,511,694 B2 | * | 3/2009 | Kim et al. | 345/98 |
| 7,688,299 B2 | * | 3/2010 | Park et al. | 345/89 |
| 2001/0027540 A1 | * | 10/2001 | Cho | 714/37 |
| 2002/0031257 A1 | * | 3/2002 | Kato | 382/165 |
| 2005/0122287 A1 | * | 6/2005 | Nishitani et al. | 345/63 |
| 2005/0190610 A1 | * | 9/2005 | Furukawa et al. | 365/189.05 |
| 2005/0264836 A1 | * | 12/2005 | Gotoh et al. | 358/1.9 |
| 2006/0132874 A1 | * | 6/2006 | Ishikawa | 358/518 |
| 2006/0250346 A1 | * | 11/2006 | Ham | 345/101 |
| 2009/0046112 A1 | * | 2/2009 | Hirao et al. | 345/690 |

FOREIGN PATENT DOCUMENTS

| | | |
|---|---|---|
| JP | 2001-320607 | 11/2001 |
| JP | 2004-120366 | 4/2004 |

\* cited by examiner

*Primary Examiner* — Alexander Eisen
*Assistant Examiner* — Sanjiv D Patel
(74) *Attorney, Agent, or Firm* — Robert J. Depke; The Chicago Technology Law Group, LLC

(57) ABSTRACT

An image processing apparatus is disclosed which carries out correction processing of an image signal made up of a plurality of bits. The apparatus includes: a correction processing unit configured to perform gamma correction of an input image signal; and a fine control processing unit configured to establish as desired a plurality of types of correction data in accordance with a plurality of fixed gray-scale levels of the input signal in order to fine-control a transmittance characteristic, known as a V-T curve, regarding an applied voltage by performing computations on the input image signal gamma-corrected by the correction processing unit using the established correction data.

20 Claims, 16 Drawing Sheets

FIG.10

| LOW-ORDER 2-BIT DATA (INTERPOLATION-USE BITS) | GAMMA CORRECTION VALUE DATA |
|---|---|
| 00 | GAMMA CORRECTION VALUE OF POINT A |
| 01 | $\dfrac{\text{(GAMMA CORRECTION VALUE OF POINT B - GAMMA CORRECTION VALUE OF POINT A)}}{2} \times \dfrac{1}{4}$ + GAMMA CORRECTION VALUE OF POINT A |
| 10 | $\dfrac{\text{(GAMMA CORRECTION VALUE OF POINT B - GAMMA CORRECTION VALUE OF POINT A)}}{2} \times \dfrac{1}{2}$ + GAMMA CORRECTION VALUE OF POINT A |
| 11 | $\dfrac{\text{(GAMMA CORRECTION VALUE OF POINT B - GAMMA CORRECTION VALUE OF POINT A)}}{2} \times \dfrac{3}{4}$ + GAMMA CORRECTION VALUE OF POINT A |

IMAGE PROCESSING APPARATUS, IMAGE PROCESSING METHOD, DISPLAY APPARATUS, AND PROJECTION DISPLAY APPARATUS

CROSS REFERENCES TO RELATED APPLICATIONS

The present invention contains subject matter related to Japanese Patent Application JP 2006-333576 filed with the Japan Patent Office on Dec. 11, 2006, the entire contents of which being incorporated herein by reference.

BACKGROUND OF THE INVENTION

1. Field of the Invention

The present invention relates to an image processing apparatus, an image processing method, a display apparatus, and a projection display apparatus for carrying out image signal correction processing, among others.

2. Description of the Related Art

There exist image processing apparatuses capable of image signal correction such as gamma correction, typically using digital circuits for multiple-point break correction as part of a correction circuit that carries out gamma correction based on a look-up table (LUT) arrangement. Apparatuses of this type are disclosed illustratively in Japanese Patent Laid-open Nos. 2001-320607 and 2004-120366.

In recent years, the LUT-based digital correction circuit has come to gain widespread acceptance because of its high accuracy of image signal correction. A typical LUT-based digital correction circuit uses as its LUT a memory having $2^n$ addresses, "n" being the number of quantization bits in an input signal. The LUT accommodates gamma correction data corresponding to the level of the input signal. Furnished with the LUT, the correction circuit performs gamma correction by taking into account the transmittance characteristic (V-T characteristic) with regard to the applied voltage of the image display apparatus of interest.

In other words, the image display apparatus such as a liquid crystal displays establishes in its storage unit an LUT containing gray-level correction data computed in accordance with a V-T curve characteristic of the transmittance regarding the applied voltage. The display apparatus carries out gray-level correction by reading the gray-level correction data from R, G and B input signals.

The above-cited patent application No. 2004-120366 discloses a technique practiced in conjunction with an LUT divided into a first and a second memory unit. In operation, gamma correction data about two nearby points of an input signal is derived from the address corresponding to the input signal and input as designated to either of the two memory units.

The above technique involves generating gamma correction value data by executing linear interpolation based on the designated correction data and on the input signal. The memory capacity needed for table translation is reduced by performing computations to interpolate what is lacking in LUT capacity as well as in the amount of necessary data.

SUMMARY OF THE INVENTION

According to the technique outlined above, the gray-level correction data corresponding to the signal level is read from the memory before being output. Where data is to be modified, one of two things thus needs to be carried out: either the LUT content is to be updated and written back to the memory, or one of as many memory units as the number of predetermined LUT divisions needs to be accessed again.

Where the LUT content is to be updated and written back to the memory, it takes time to update the gamma correction data before it is stored into the memory. Where one of the multiple memory units is to be accessed again, the growing number of memory units ends up enlarging the scale of circuitry and leads to an increase in power dissipation.

According to the technique disclosed by the above-cited patent application No. 2004-120366, the memory capacity needed for table translation is supposed to be reduced by doing computations to interpolate what is lacking in LUT capacity as well as in the amount of necessary data. This, however, applies only to each individual memory unit. Where the two memory units involved are juxtaposed, the scale of the LUT turns out to be about the same as what has been traditionally the case. That means the above-mentioned drawbacks still remain unresolved.

The present invention has been made in view of the above circumstances and provides an image processing apparatus, an image processing method, a display apparatus, and a projection display apparatus for shortening the time it takes to update correction data and for carrying out image signal correction without incurring an increase in the scale of circuitry or in power dissipation.

In carrying out the present invention and according to one embodiment thereof, there is provided an image processing apparatus for carrying out correction processing of an image signal made up of a plurality of bits, the image processing apparatus including: a correction processing unit configured to perform gamma correction of an input image signal; and a fine control processing unit configured to establish as desired a plurality of types of correction data in accordance with a plurality of fixed gray-scale levels of the input signal in order to fine-control a transmittance characteristic, known as a V-T curve, regarding an applied voltage by performing computations on the input image signal gamma-corrected by the correction processing unit using the established correction data.

Preferably, the image processing apparatus may further include a unit configured to let a user define an effective image range and a fine-control correction processing range of a particular location for the fine control processing unit.

Preferably, the fine control processing unit may fine-control the V-T curve with regard to either a particular location of a screen display area or a specific gray-scale level.

Preferably, the fine control processing unit may have banks configured to retain the correction data; and the fine control processing unit may read from designated banks the correction data corresponding to two points located at nearby gray-scale levels of given data in accordance with predetermined high-order bits of the input signal, perform linear interpolation processing based on the correction data about the two points and on low-order bits of the input signal other than the high-order bits used to read the correction data from the input signal, and perform computations to either add an outcome of the linear interpolation to the input signal or to subtract the outcome from the input signal.

Preferably, the fine control processing unit may perform clipping with an overflow and an underflow taken into consideration following the computations.

Preferably, the correction processing unit may include: a memory configured to store look-up table type gamma correction data computed in keeping with the V-T curve characteristic of the image processing apparatus; and a selector configured to select either the gamma-corrected signal or a gamma-uncorrected signal.

Preferably, the image processing apparatus may further include: an acquisition unit configured to acquire status information about the image processing apparatus; and a unit configured to either select or update data automatically by receiving the status information acquired by the acquisition unit, by supplementing the status information with the V-T characteristic to create feedback data, and by having the feedback data reflected in the correction data inside the fine control processing unit.

According to another embodiment of the present invention, there is provided an image processing method for carrying out correction processing of an image signal made up of a plurality of bits, the image processing method including the steps of: firstly performing gamma correction of an input image signal; secondly establishing as desired a plurality of types of correction data in accordance with a plurality of fixed gray-scale levels of the input signal; and thirdly fine-controlling a transmittance characteristic, known as a V-T curve, regarding an applied voltage by performing computations on the signal gamma-corrected in the first step using the established correction data.

According a further embodiment of the present invention, there is provided a display apparatus including an image processing apparatus for carrying out correction processing of an image signal made up of a plurality of bits, the image processing apparatus including: a correction processing unit configured to perform gamma correction of an input image signal; and a fine control processing unit configured to establish as desired a plurality of types of correction data in accordance with a plurality of fixed gray-scale levels of the input signal in order to fine-control a transmittance characteristic, known as a V-T curve, regarding an applied voltage by performing computations on the input image signal gamma-corrected by the correction processing unit using the established correction data.

According to an even further embodiment of the present invention, there is provided a projection display apparatus including: a light source; at least one liquid crystal display unit configured to include an image processing apparatus for carrying out correction processing of an image signal made up of a plurality of bits; a light focusing system configured to focus light emitted by the light source onto the liquid crystal display unit; and an optical projection system configured to expand the light optically modulated by the liquid crystal display unit for projection purposes; wherein the image processing apparatus in the liquid crystal display unit includes: a correction processing unit configured to perform gamma correction of an input image signal; and a fine control processing unit configured to establish as desired a plurality of types of correction data in accordance with a plurality of fixed gray-scale levels of the input signal in order to fine-control a transmittance characteristic, known as a V-T curve, regarding an applied voltage by performing computations on the input image signal gamma-corrected by the correction processing unit using the established correction data.

According to embodiments of the present invention outlined above, the correction processing unit typically performs gamma correction of the input image signal and supplies the result of the correction to the fine control processing unit. The fine control processing unit allows a plurality of types of correction data to be established in accordance with a plurality of fixed gray-scale levels of the input signal, and performs computations on the input image signal gamma-corrected by the correction processing unit using the established correction data. This enables the fine control processing unit to fine-control the transmittance characteristic (V-T curve) regarding the applied voltage.

Embodiments of the present invention thus shorten the time required to update correction data and carry out image signal correction without incurring an increase in the scale of circuitry or in power dissipation.

BRIEF DESCRIPTION OF THE DRAWINGS

FIG. 10 is a tabular view explanatory of how the low-order bits of an input signal to the interpolation computing unit in the correction circuit of FIG. 7 correspond to gamma correction value data;

DETAILED DESCRIPTION OF THE PREFERRED EMBODIMENTS

The preferred embodiments of the present invention will now be described in reference to the accompanying drawings.

What follows is a description of a front/rear projection system incorporating an LCD panel that adopts the correction circuit of an image processing apparatus according to the present embodiment.

Figure 1:
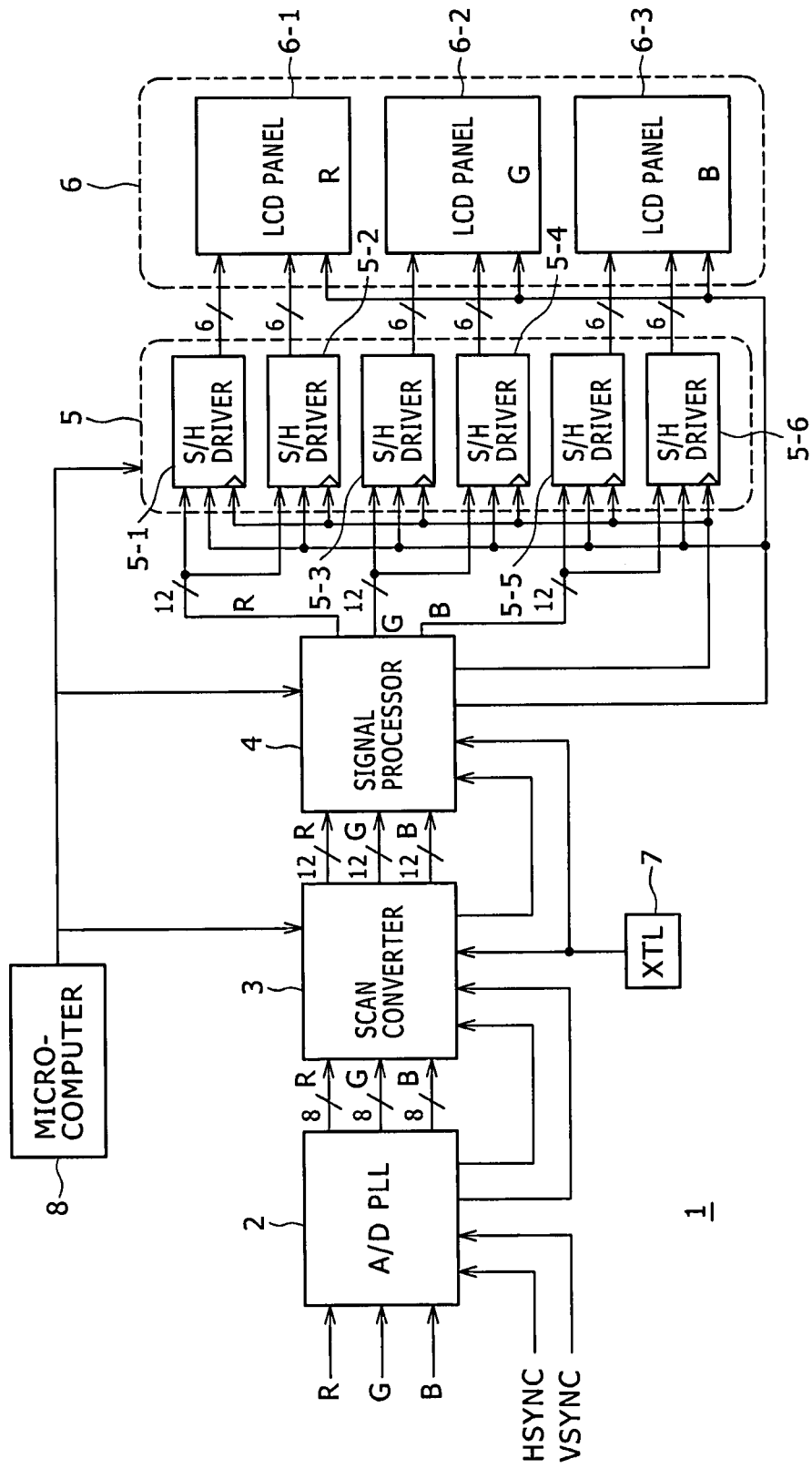
FIG. 1 is a function block diagram showing a typical structure of an image processing apparatus according to one embodiment of the present invention.

FIG. 1 is a function block diagram showing a typical structure of the image processing apparatus 1 embodying the present embodiment.

The inventive mage processing apparatus 1 typically utilizes a display device such as an LCD that gives nonlinear optical responses to the input levels of an image signal. Using a linear correction function, the image processing apparatus 1 interpolates two parameters: a look-up table containing gamma correction value data, and correction values created from the input image signal and from the look-up table.

More specifically, the image signal is adjusted to the characteristics of an output device. This is accomplished through gamma correction using an interpolation function for interpolating what is lacking in LUT capacity as well as in the amount of necessary data.

A V-T curve characteristic of the image processing apparatus such as a liquid crystal display unit is handled by a gamma correction fine control feature. The feature involves establishing as many as "M" types of correction data in accordance with fixed gray-scale levels of input data, and adding and subtracting the suitably established correction data to and from the gamma-corrected signal so as to fine-control the V-T curve.

As shown in FIG. 1, the image processing apparatus 1 includes an A/D PLL 2, a scan converter 3, a signal processor 4, a sample/hold (S/H) driver 5, an LCD panel 6, a reference clock unit (crystal; XTL) 7, and a microcomputer 8 serving as a control unit.

For the image processing apparatus 1, the data input to and output from the signal processor 4 is 12 bits long; the data input to the S/H driver 5 is 12 bits long and the data output therefrom is 6 bits long; and the data input to the LCD panel 6 is 12 bits long.

The A/D PLL 2 typically subjects input analog video signals to analog-to-digital conversion. Digital signals thus created are output to the scan converter 3.

More specifically, the A/D PLL 2 converts an analog video signal R (red), an analog video signal G (green), and an analog video signal B (blue) to digital format on the basis of a horizontal synchronization signal (HSYNC) and a vertical synchronization signal (VSYNC). The conversion creates a digital R signal, a digital G signal, and a digital B signal which are 8 bits long each and are output to the scan converter 3.

The A/D PLL 2 further forwards the horizontal synchronization signal (HSYNC) and vertical synchronization signal (VSYNC) to the scan converter 3.

Given the digital signals from the A/D PLL 2, the scan converter 3 performs scaling, dithering and other processes to create 12-bit-long digital signals that are output to the signal processor 4.

More specifically, the scan converter 3 operates based on a reference clock signal output by the reference clock unit (XTL) 7 as well as on the horizontal synchronization signal (HSYNC) and vertical synchronization signal (VSYNC) coming from the A/D PLL 2. Operating in this manner, the scan converter 3 carries out scaling, dithering and other processes on the 8-bit-long digital R, G and B signals. The processing typically produces 12-bit-long R, G and B signals that are output to the signal processor 4.

Furthermore, the scan converter 3 forwards the synchronization signals to the signal processor 4.

Given the digital input signals from the scan converter 3, the signal processor 4 performs predetermined processes on the received signals and outputs the outcome of the processing to the S/H driver 5.

More specifically, the signal processor 4 operates in synchronism based on the reference clock signal output by the reference clock unit (XTL) 7 and on the synchronization signals coming from the scan converter 3. Operating in this manner, the signal processor 4 carries out predetermined processes including gamma correction and gamma fine control, to be discussed later, on the 12-bit-long R, G and B signals coming from the scan converter 3. The processing generates 12-bit-long R, G and B signals which are output to the S/H driver 5.

The signal processor 4 outputs a synchronization signal (timing pulses) to the S/H driver 5. Furthermore, the signal processor 4 outputs predetermined signals such as setting signals to the LCD panel 6.

The sample/hold (S/H) driver 5 operates in synchronism with the synchronization signal coming illustratively from the signal processor 4. Operating in this manner, the S/H driver 5 performs sample/hold processing on the image signals coming from the signal processor 4 and outputs the processed signals to the LCD panel 6.

The S/H driver 5 typically includes a plurality of S/H driver units 5-1 through 5-6. Illustratively, the S/H driver units 5-1 and 5-2 may address the R signal in the vertical and horizontal directions respectively; the S/H driver units 5-3 and 5-4 may address the G signal in the vertical and horizontal directions respectively; and the S/H driver units 5-5 and 5-6 may address the B signal in the vertical and horizontal directions respectively.

The LCD panel 6 displays images corresponding to the signals coming from the S/H driver 5. Typically, the LCD panel 6 includes a plurality of LCD panel units 6-1 through 6-3.

Illustratively, the LCD panel unit 6-1 may display images corresponding to the 6-bit-long R signal output by the S/H driver units 5-1 and 5-2 and to a predetermined signal coming from the signal processor 4.

The LCD panel unit 6-2 may display images corresponding to the 6-bit-long G signal output by the S/H driver units 5-3 and 5-4 and to the predetermined signal coming from the signal processor 4.

The LCD panel unit 6-3 may display images corresponding to the 6-bit-long B signal output by the S/H driver units 5-5 and 5-6 and to the predetermined signal coming from the signal processor 4.

The workings of the image processing apparatus 1 whose structure was discussed above will now be outlined below.

Analog video signals are converted from analog to digital format by the A/D PLL (converter) 2. The resulting signals in digital format are subjected to scaling and dithering by the scan converter 3 which in turn outputs resulting 12-bit-long digital data.

The digital data is input to the signal processor 4. Inside the signal processor 4, a gamma correction circuit (block), to be discussed later, performs gamma correction and gamma fine control on the input data in a manner adapted to the V-T characteristic of the LCD panel 6.

The processed data is output as image signals. The output image signals are subjected to sample/hold processing by the sample/hold driver 5. The signals thus processed are output by the sample/hold driver 5 to the LCD panel 6 for image display.

Figure 2:
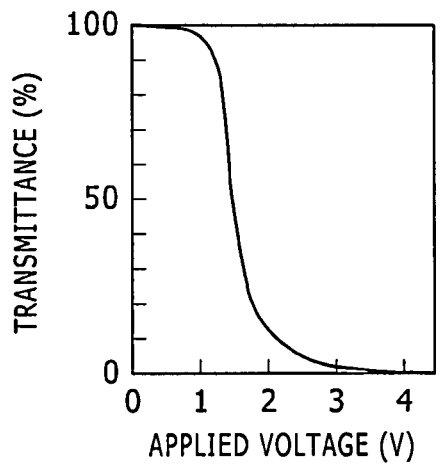
FIG. 2 is a graphic representation showing a transmittance characteristic (V-T characteristic) regarding an applied voltage to an LCD (liquid crystal display) panel.

FIG. 2 is a graphic representation showing a transmittance characteristic (V-T characteristic) regarding an applied voltage to an LCD (liquid crystal display) panel.

At the LCD panel 6, the transmittance characteristic (called the V-T characteristic hereunder) regarding the applied voltage appears nonlinear as shown in FIG. 2. Illustratively, FIG. 2 indicates the typical V-T characteristic of the normally white transmissible liquid crystal.

Figure 3:
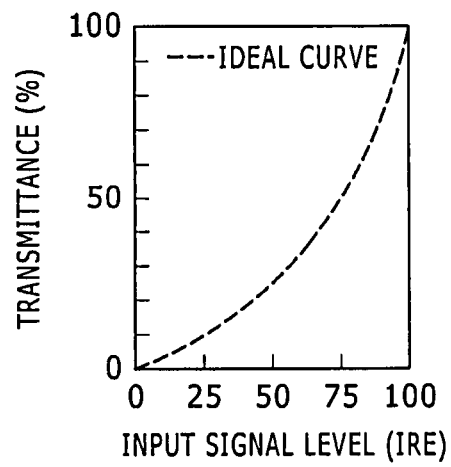
FIG. 3 is a graphic representation showing an ideal transmittance characteristic with regard to input signal levels.
Figure 4:
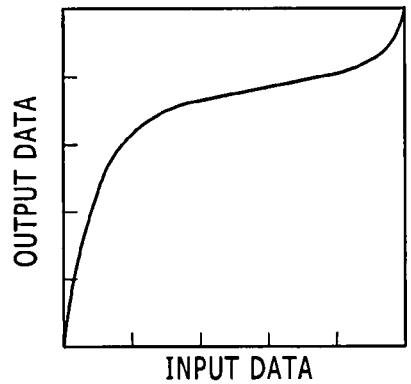
FIG. 4 is a graphic representation showing a gamma-corrected curve.

FIG. 3 is a graphic representation showing an ideal transmittance characteristic with regard to input signal levels. FIG. 4 graphically shows a gamma-corrected curve.

In view of the gray-scale recognition characteristic of the humans, the display brightness of the image processing apparatus 1 should preferably be such that the transmittance with regard to the input signal level may become exponential, as illustrated in FIG. 3.

These two conditions demand that the output signal level (applied voltage to liquid crystal) with respect to the input signal level be corrected nonlinearly as shown in FIG. 4. This type of correction is called gamma correction.

For example, an image displayed by the image processing apparatus 1 is captured by a camera or the like. Gamma correction value data is then computed on the basis of the output signal level of the image processing apparatus 1 and the signal level of the signal processor 4. At this point, the image processing apparatus 1 according to the present embodiment does not store into a look-up table the gamma correction value data about all input signal levels. Instead, the image processing apparatus 1 stores the gamma correction value data about the input signals having predetermined quantization bits.

When performing correction based on an input signal, the image processing apparatus including the correction circuit according to the present embodiment references the look-up table to output the gamma correction value data corresponding to the input signal in question. If the input signal level falls into intervals between the predetermined quantization bits in the look-up table, then the image processing apparatus performs interpolation based on the input signal and look-up table in order to output gamma correction value data.

Figure 5:
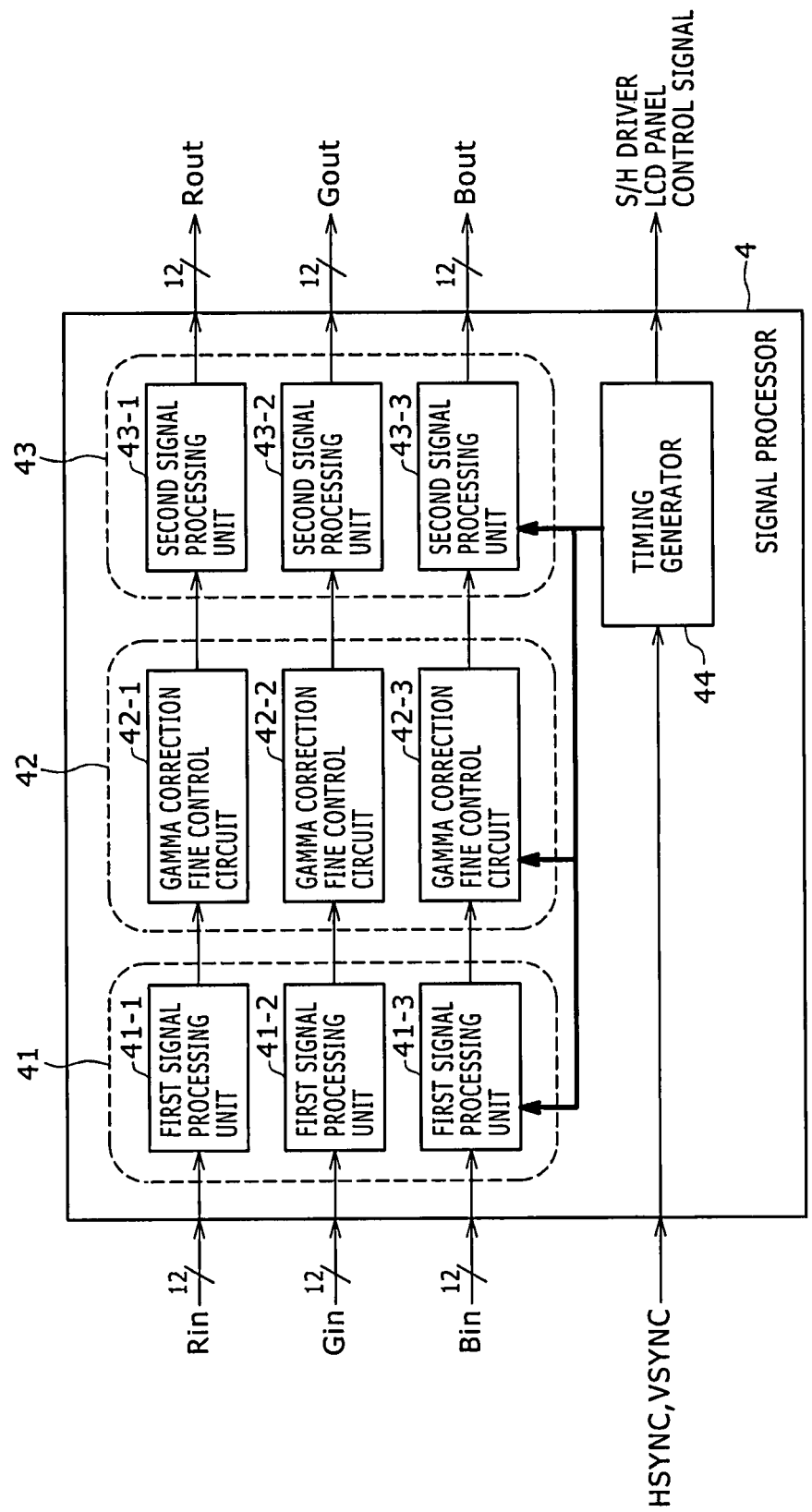
FIG. 5 is a function block diagram showing a typical structure of a signal processor in the image processing apparatus shown in FIG. 1.

FIG. 5 is a function block diagram showing a typical structure of the signal processor in the image processing apparatus shown in FIG. 1.

The signal processor 4 includes a first signal processing unit 41, a gamma correction fine control circuit (block) 42, a second signal processing unit 43, and a timing generator 44.

The first signal processing unit 41 performs predetermined processes such as gain control and limiting and outputs the result of the processing to the gamma correction fine control circuit 42.

Illustratively, the first signal processing unit 41 is made up of a plurality of processing units: one (41-1) for handling the R signal, another (41-2) for dealing with the G signal, and another (41-3) for addressing the B signal.

The gamma correction fine control circuit 42 carries out gamma correction, to be discussed later, in response to the signals output by the first signal processing unit 41 and further submits the corrected signals to gamma fine control. The results of the processing are output to the second signal processing unit 43.

Typically, the gamma correction fine control circuit 42 is constituted by a plurality of control circuits: one (42-1) for processing the R signal, another (42-2) for addressing the G signal, and another (42-3) for dealing with the B signal.

The second signal processing unit 43 performs predetermined processes such as gain control and limiting in response to the signals output by the gamma correction fine control circuit 42. The results of the processing are output to the S/H driver 5.

Typically, the second signal processing unit 43 is formed by a plurality of processing units: one (43-1) for handling the R signal, another (43-2) for addressing the G signal, and another (43-3) for dealing with the B signal.

The timing generator 44 outputs control signals in a suitably timed manner to the S/H driver 5 and LCD panel 6 based on the horizontal synchronization signal (HSYNC) and vertical synchronization signal (VSYNC), as well as on an output R signal Rout, an output G signal Gout, and an output B signal Bout processed by the first signal processing unit 41, gamma correction circuit 42, and second signal processing unit 43. The control signals are used illustratively to control the settings of the LCD panel 6.

In the signal processor 4 of the above-described structure, an input R signal Rin is processed by the first signal processing unit 41-1, by the gamma correction fine control circuit 42-1, and by the second signal processing unit 43-1 to constitute eventually the R signal Rout that is output.

Likewise, an input G signal Gin is processed by the first signal processing unit 41-2, by the gamma correction fine control circuit 42-2, and by the second signal processing unit 43-2 to constitute eventually the G signal Gout that is output.

Similarly, an input B signal Bin is processed by the first signal processing unit 41-3, by the gamma correction fine control circuit 42-3, and by the second signal processing unit 43-3 to constitute eventually the B signal Bout that is output.

Figure 6:
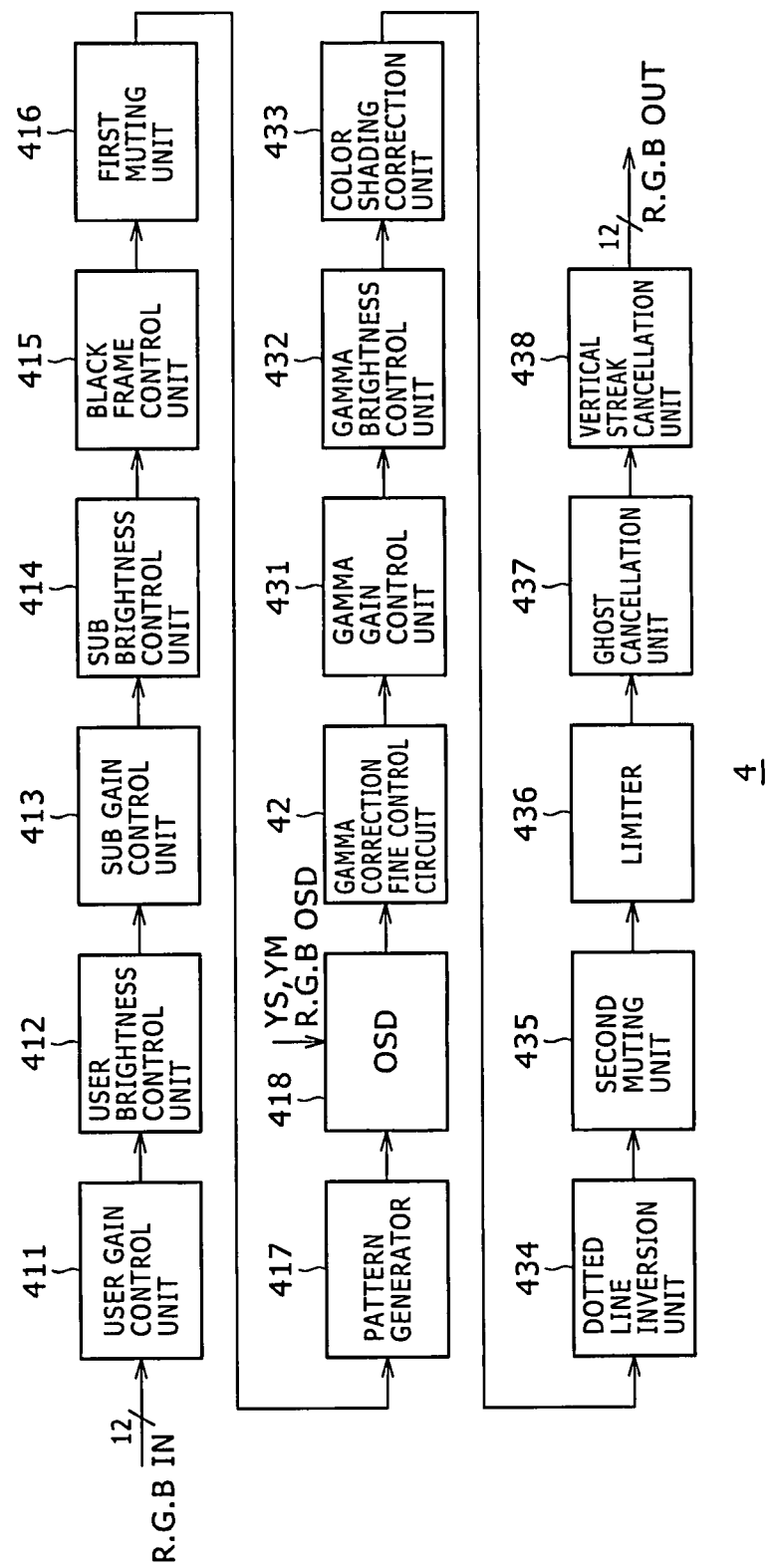
FIG. 6 is a schematic view showing typical function blocks of the signal processor shown in FIG. 5.

FIG. 6 is a schematic view showing typical function blocks of the signal processor 4 shown in FIG. 5. The signal processor 4 may illustratively include a user gain control unit 411, a user brightness control unit 412, a sub gain control unit 413, a sub brightness control unit 414, a black frame control unit 415, a first muting unit 416, a pattern generator 417, an on-screen display (OSD) 418, a gamma correction fine control circuit 42, a gamma gain control unit 431, a gamma brightness control unit 432, a color shading correction unit 433, a dotted line inversion unit 434, a second muting unit 435, a limiter 436, a ghost cancellation unit 437, and a vertical streak cancellation unit 438, as shown in FIG. 6.

Each of these blocks will now be described briefly. The coefficients and other parameters for use by the function blocks are typically established by a host device, not shown, through a host interface, also not shown.

The user gain control unit 411 performs multiplications illustratively for user control gain adjustment. The user gain control unit 411 operates on a 12-bit-long input signal and on an eight-bit-long coefficient for multiplication. The product of the operation is rounded off to predetermined bit positions. The resulting 12-bit-long data is output to the user brightness control unit 412.

The user brightness control unit 412 performs additions and subtractions for user control brightness adjustment. The user brightness control unit 412 operates on the 12-bit-long input signal coming from the user gain control unit 411 and on a 13-bit-long coefficient (its MSB is a sign bit). The resulting 12-bit-long data is output to the sub gain control unit 413.

The sub gain control unit 413 performs multiplications for white balance gain adjustment. The sub gain control unit 413 operates on the 12-bit-long input signal coming from the user brightness control unit 412 and on an eight-bit-long coefficient. The product of the operation is rounded off to predetermined bit positions before being clipped. The resulting 12-bit-long data is output to the sub brightness control unit 414.

The sub brightness control unit 414 performs additions and subtractions for white balance brightness adjustment. Illustratively, the sub brightness control unit 414 carries out an addition or subtraction based on the 12-bit-long input signal coming from the sub gain control unit 413 and on a predetermined coefficient (its MSB is a sign bit). The resulting 12-bit-long data is output to the black frame (block) control unit 415.

The black frame (block) control unit 415 fixes the blanking period of the image signal to a desired level independently of the outcome of the upstream signal processing. If the number of pixels determined by the effective period of the image signal to be displayed fails to fill the number of pixels to be displayed on the LCD panel 6, then the remaining pixels are displayed as the blanking period of the image signal. In that case, the black frame control unit 415 fixes the blanking period to a desired level regardless of the results of image quality controls such as gain and brightness adjustments. The black frame control unit 415 in this setup replaces a desired range of the image signal with 12-bit-long data by switching the image signal and coefficients using pulses output by a pulse decoder, not shown. The resulting 12-bit-long data is output to the first muting unit 416.

The first muting unit 416 replaces the 12-bit-long input signal with data of a desired level for muting purposes. The 12-bit-long data resulting from the processing is output to the pattern generator 417.

Independently of the input signal, the pattern generator 417 generates such fixed patterns as vertical stripes, slanting stripes, horizontal stripes, cross hatches, dots, horizontal ramps, horizontal stairs, vertical ramps, and vertical stairs in response to requests. The fixed pattern thus generated is output to the OSD 418.

The OSD 418 admits two-bit color OSD signals as well as a YS and a YM signal, and carries out half-tone processing and OSD_MIX processing of the image signal. The result of the processing is output to the gamma correction fine control circuit 42.

The gamma correction fine control circuit 42 performs gamma correction and gamma fine control, to be discussed later, based on the 12-bit-long data coming from the OSD 418. The resulting 12-bit-long data is output to the gamma gain control unit 431.

Given the 12-bit-long input signal from the gamma correction fine control circuit 42, the gamma gain control unit 431 performs multiplications in a gain control process for correcting deviations in the V-T characteristic of the LCD panel 6. The 12-bit-long data resulting from the processing is output to the gamma brightness control unit 432.

The gamma brightness control unit 432 receives the gamma-corrected 12-bit-long signal from the gamma gain control unit 431, and performs additions and subtractions in a brightness control process for correcting deviations in the V-T characteristic of the LCD panel 6. The 12-bit-long data resulting from the processing is output to the color shading correction unit 433.

The color shading correction unit 433 corrects color shading by adding correction signals to the image signal. Illustratively, the color shading correction unit 433 establishes correction points at fixed intervals in the horizontal, vertical, and gray-scale directions of the image signal. The correction unit 433 then writes correction data of the correction points to a RAM, not shown, before retrieving the data therefrom for an interpolating process whereby a correction curve is created. In accordance with the correction curve, the color shading correction unit 433 corrects color shading and outputs the resulting 12-bit-data to the dotted line inversion unit 434.

The dotted line inversion unit 434 performs signal processing for driving dotted line inversion based on the 12-bit-long data coming from the color shading correction unit 433. The result of the processing is output to the second muting unit 435.

The second muting unit 435 carries out a muting process by substituting data of a desired level for the image signal coming from the dotted line inversion unit 434. The result of the processing is output to the limiter 436.

Based on the 12-bit-long signal from the second muting unit 435, the limiter 436 performs a limiting process in such a manner that the output signal will not exceed a predetermined limit. The resulting 12-bit-long data is output to the ghost cancellation unit 437.

Through signal processing based on the 12-bit-long data from the limiter 436, the ghost cancellation unit 437 cancels the ghost that may occur inside the LCD panel 6. The result of the processing is output to the vertical streak cancellation unit 438.

The vertical streak cancellation unit 438 performs a correcting process for minimizing the streaks that may occur in the LCD panel 6. The result of the processing is output in the form of a 12-bit-long signal.

The above-described function blocks making up the signal processor 4 handle the R signal, G signal, and B signal independently of one another.

Figure 7:
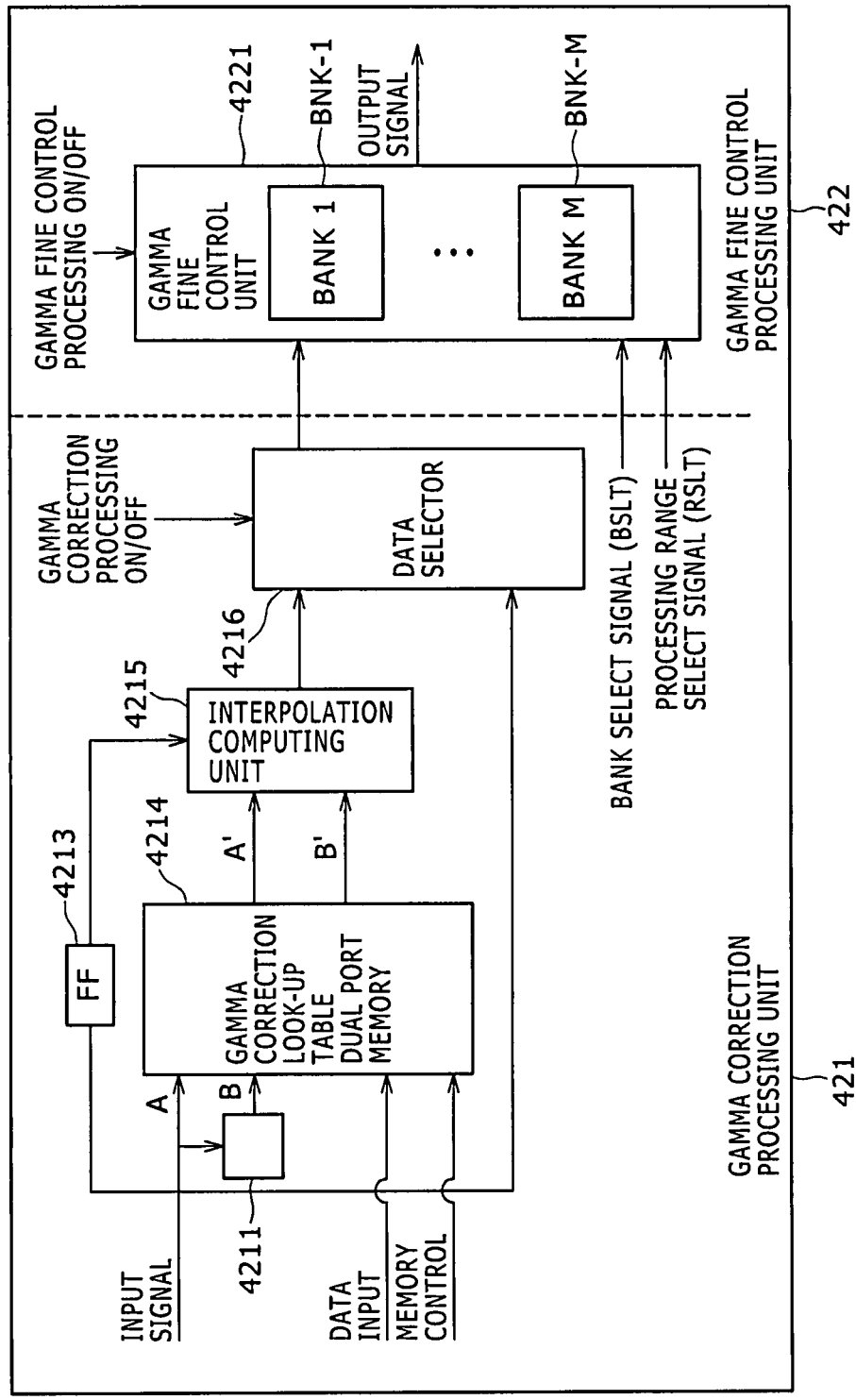
FIG. 7 is a function block diagram showing a typical structure of a gamma correction fine control circuit shown in FIG. 5 as an embodiment of the present invention.

FIG. 7 is a function block diagram showing a typical structure of the gamma correction fine control circuit 42 shown in FIG. 5 as an embodiment of the present invention. As shown in FIG. 7, the gamma correction fine control circuit 42 includes a gamma correction processing unit 421 and a gamma fine control processing unit 422.

The gamma correction processing unit 421 includes an addition and overflow processing unit 4211, a flip-flop (FF) 4213, a gamma correction look-up table memory (or simply called the memory) 4214, an interpolation computing unit 4215, and a data selector 4216, as depicted in FIG. 7.

The addition and overflow processing unit 4211 extracts high-order bits of a predetermined bit width from the input image signal, and supplements the extracted bits with bits of a predetermined bit width to create correction-use bits that are output.

Illustratively, the addition and overflow processing unit 4211 extracts high-order bits of a predetermined bit width at point A, and supplements the extracted bits of point A with bits of a predetermined bit width to create correction-use bits for point B which are output. These two points close to each other in the input signal are created in accordance with the quantization bits in the look-up table.

More specifically, two nearby points A and B are assumed to exist in the input signal with regard to the quantization bits in the memory 4214, to be discussed later. In order to interpolate the stretch between the two points using a linear interpolation function, the addition and overflow processing unit 4211 extracts the high-order 10 bits at point A as correction-use bits from the 12-bit-wide input signal, and adds "1" to the tenth bit in the extracted bits to create correction-use bits for point B which are output to the memory 4214.

Illustratively, the addition and overflow processing unit 4211 generates a signal by adding "1" to the tenth bit of the high-order 10 bits in the input signal, and inputs the generated signal to each address port of the memory 4214.

The flip-flop (FF) 4213 adjusts the timing for placing the input signal into the interpolation computing unit 4215. The flip-flop 4213 holds the bits remaining in the input signal minus its correction-use bits, i.e., the low-order two bits of the input signal, and outputs the retained bits to the interpolation computing unit 4215 illustratively at the same time as correction value data is output by the memory 4214.

The gamma correction look-up memory 4214 (memory) stores a gamma correction look-up table (LUT) in which high-order interpolation-use bits of a predetermined bit width from an input signal of a given gray-scale level are associated with gamma correction value data. Typically, where the high-order 10 bits of the input signal are to be input as correction-use bits to the memory 4214, the memory 4214 is structured as a dual port memory having a memory capacity of 1024 words (=$2^{10}$) and equipped with two read ports. In this structure, the memory 4214 accommodates the gamma correction value data.

Figure 8:
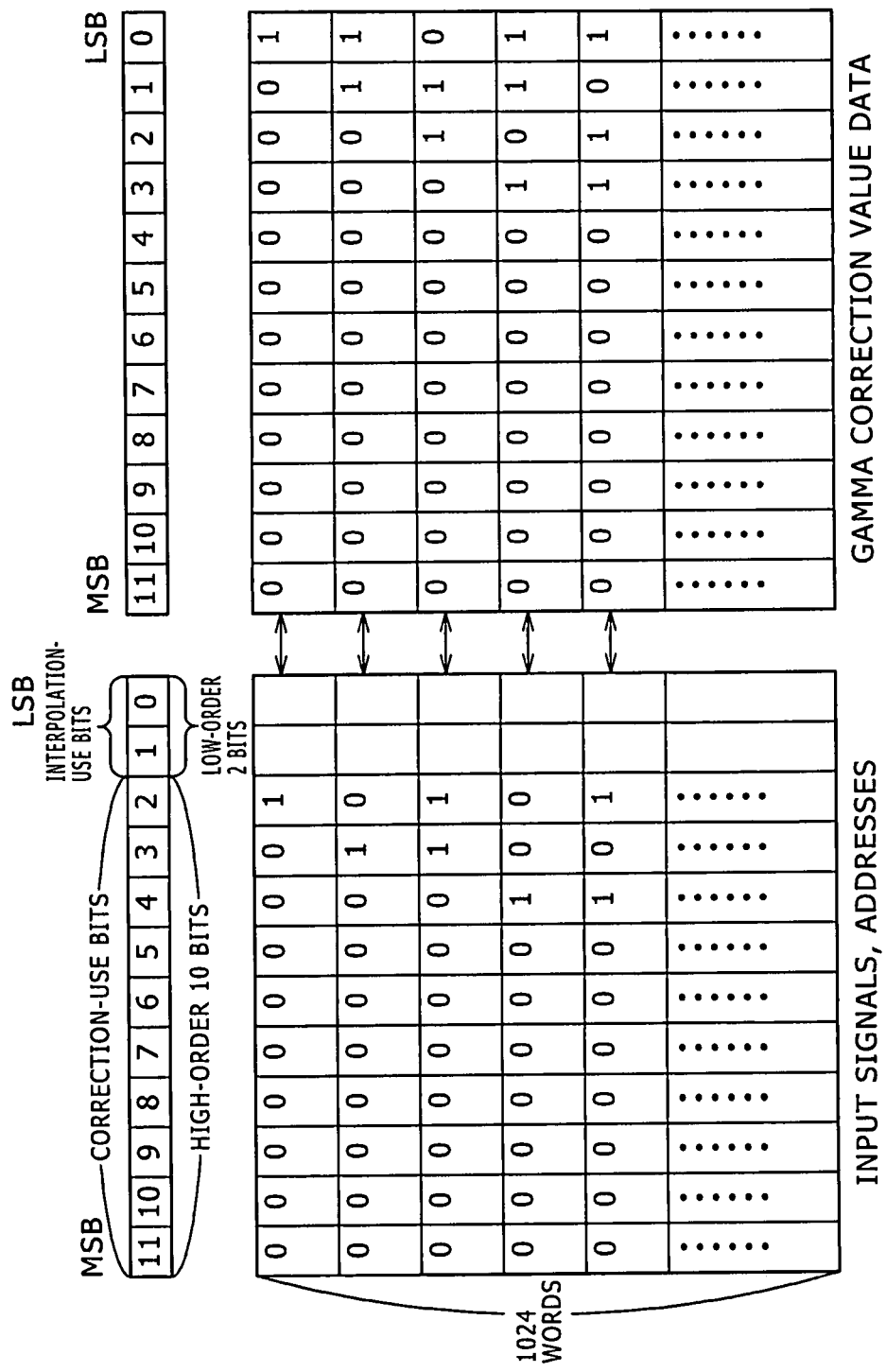
FIGS. 8A and 8B are tabular views explanatory of a look-up table (LUT) in a memory of the gamma correction fine control circuit shown in FIG. 7.

FIGS. 8A and 8B are tabular views explanatory of a look-up table (LUT) in the memory of the gamma correction fine control circuit shown in FIG. 7. FIG. 8A shows correction-use bits taken from predetermined high-order bits of the input signal, the correction-use bits corresponding to addresses in the memory 4214. FIG. 8B indicates gamma correction value data corresponding to the correction-use bits of the input signal shown in FIG. 8A.

Typically, the gamma correction value data is a kind of data which associates the input signal level with the output signal level as illustrated in FIG. 4. The gamma correction value data is created illustratively based on the result of a comparison made between the signal captured by an imaging device (e.g., camera) of the image being displayed in response to an input signal on the one hand, and the input signal in question on the other hand.

The memory 4214 has correction value data written to the address corresponding to predetermined high-order correction-use bits of a given input signal, the correction value data thus written corresponding to the predetermined high-order correction-use bits of the input signal in question, as shown in FIGS. 8A and 8B.

The memory 4214 is structured illustratively as a dual port memory. When the correction-use bits relative to each of points A and B are input through the ports, the bits are converted to corresponding correction value data through table translation. The correction value data resulting from the translation is output to the interpolation computing unit 4215.

The look-up table is written to the memory 4214 illustratively as follows: when a memory control signal including a write instruction is input, the correction value data is written to the designated address. Where the look-up table is to be read from the memory 4214 for verification or for other purposes, a memory control signal including a read instruction is input. In turn, the correction value data is output from the designated address.

The correction value data of points A and B is output by the memory 4214, and the low-order interpolation-use bits remaining in the input signal minus its high-order bits are output by the flip-flop 4213. The interpolation computing unit 4215 carries out a linear interpolation process based on the output correction value data as well as on the output low-order interpolation-use bits.

Figure 9:
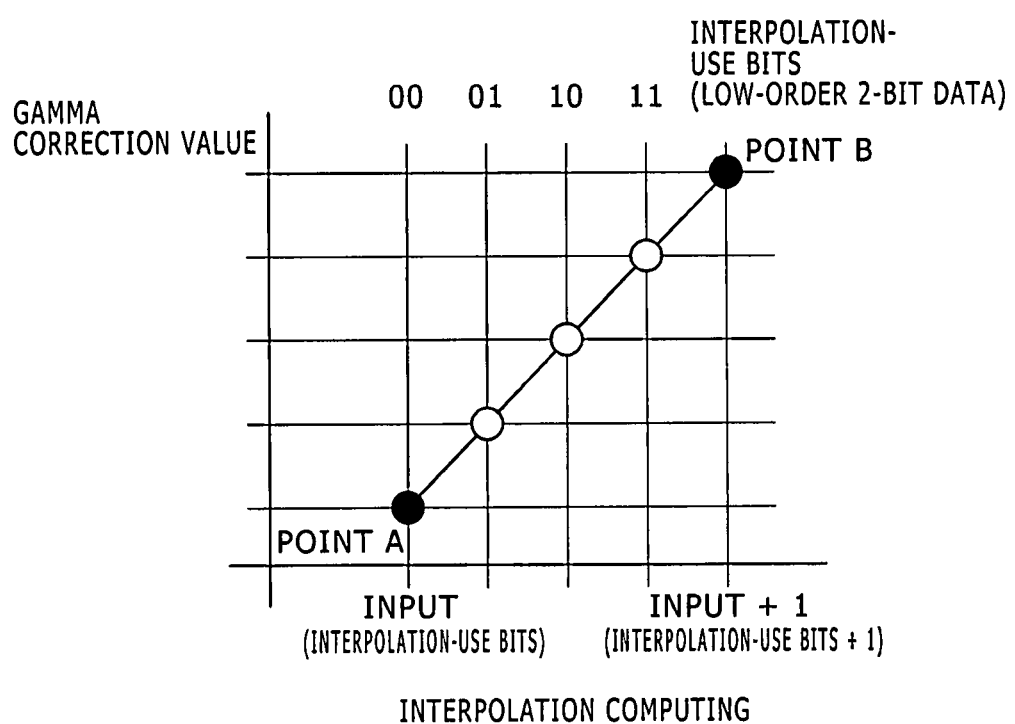
FIG. 9 is a graphic representation showing the typical workings of an interpolation computing unit in the correction circuit shown in FIG. 7.

FIG. 9 is a graphic representation showing the typical workings of the interpolation computing unit in the correction circuit shown in FIG. 7. FIG. 10 is a tabular view explanatory of how the low-order bits of an input signal to the interpolation computing unit in the correction circuit of FIG. 7 correspond to gamma correction value data.

If it is assumed that the number of quantization bits in the interpolation-use bits is two, then the interpolation computing unit 4215 may illustratively divide the interpolation value data between point A and point B into four segments. The interpolation computing unit 4215 proceeds to create interpolation value data about the quantization points resulting from the division (i.e., points at ¼, ½, and ¾ segments).

If the number of quantization bits in the interpolation-use bits is three, then the interpolation computing unit 4215 divides the interpolation value data between point A and point B illustratively into eight segments. If the number of quantization bits in the interpolation-use bits is "n," then the interpolation value data between point A and point B is divided illustratively into "$2^n$" segments. The interpolation computing unit 4215 proceeds to create interpolation value data following the division. By suitably determining the number of quantization bits in the interpolation-use bits, it is possible to deal with the memory capacity and correction accuracy level required.

Based on the interpolation-use bits of the input low-order two bits, the interpolation computing unit 4215 selects the interpolation value data and correction value data having been created. More specifically, if the interpolation-use bits of the low-order two bits from the input signal are "00," then the interpolation computing unit 4215 outputs illustratively the gamma correction value of point A, as shown in FIG. 10.

If the interpolation-use bits of the low-order two bits from the input signal are "01," then the interpolation computing unit 4215 outputs illustratively "(gamma correction value of point B−gamma correction value of point A)/2×¼+gamma correction value of point A." If the interpolation-use bits of the low-order two bits from the input signal are "10," then the interpolation computing unit 4215 outputs illustratively "(gamma correction value of point B−gamma correction value of point A)/2×½+gamma correction value of point A." If the interpolation-use bits of the low-order two bits from the input signal are "11," then the interpolation computing unit 4215 outputs illustratively "(gamma correction value of point B−gamma correction value of point A)/2×¾+gamma correction value of point A."

At this point, the gamma characteristic of the LCD panel 6 is expressed by a nonlinear function whereby the output signal always increases with regard to the input signal. This makes it possible to find the correction value data for the target input signal by adding up the value of point A at the low signal level and the interpolation value data acquired earlier.

As explained above, the interpolation computing unit 4215 creates interpolation value data corresponding to the low-order interpolation-use bits based on the correction value data of points A and B. The unit 4215 then selects the correction value data corresponding to the interpolation-use bits of the low-order bits from the input signal. However, this arrangement is not limitative of the present invention. Alternatively, the interpolation value data between points A and B may not be computed. Instead, given the correction value data of points A and B and the interpolation-use bits of the low-order bits from the input signal, the interpolation computing unit 4215 may create solely the correction value data corresponding to the interpolation-use bits.

In response to control signals coming from the microcomputer 8, the data selector 4216 selects either the signal having undergone gamma correction by the interpolation computing unit 4215 or the input signal not subject to the gamma correction process. The selected signal is output to the gamma fine control processing unit 422.

The gamma fine control processing unit 422 is capable of establishing as many as M kinds of correction data in accordance with each fixed gray-scale level of the input data so as to deal with the V-T curve characteristic. Using the established correction data, the gamma fine control processing unit 422 performs additions and subtractions to and from the gamma-corrected signal in order to fine-control the V-T curve.

The gamma fine control processing unit 422 carries out its function as follows: in response to the gamma-corrected input data coming from the gamma correction processing unit 421, the gamma fine control processing unit 422 establishes beforehand correction data in each of M banks BNK-1 through BNK-M constituting a fine control unit 4221 with regard to each of the R, G and B signals for the correction point at each of fixed N gray-scale levels. The banks BNK-1 through BNK-M may be constituted illustratively by registers of which the values may be rewritten (i.e. updated) as desired through the microcomputer 8. The fine control unit 4221 may be functionally turned on and off in response to control signals from the microcomputer 8.

Illustratively, in response to a bank select signal BSLT coming from the microcomputer 8, the fine control unit 4221 performs its correction process (i.e., gamma fine control) by gaining access to the correction data established in one of the banks BNK-1 through BNK-M. In this case, the image processing apparatus 1 (e.g., liquid crystal display unit) acting as a display device giving nonlinear optical responses performs an interpolation computing process on the input signal and on the established correction data using a linear correction function. The result of the processing is added to or subtracted from the input signal.

In carrying out its gamma fine control process, the fine control unit 4221 first reads from the designated bank the correction data corresponding to points A and B on a nearby gray-scale level of the input signal according to the high-order bits of the input signal. The fine control unit 4221 then performs the linear interpolation of $IN[Z:0]*(A-B)/2^{(Z+1)}$ based on the correction data of points A and B and on the low-order bits (IN[Z:0]) remaining in the input signal minus its high-order bits used to read the correction data, where Z represents the number of quantization bits. The correction accuracy of the computations involved can be addressed by suitably setting the quantization bit count Z. The result of the computations is added to or subtracted from the input signal which in turn is clipped with overflow and underflow taken into consideration. The fine control unit 4221 thus provides the definitive result of its fine control processing.

The above-described embodiment allows the user to designate an effective image area and a fine control correction processing range of a particular location by defining a processing range select signal RSLT illustratively through the microcomputer 8.

Figure 11:
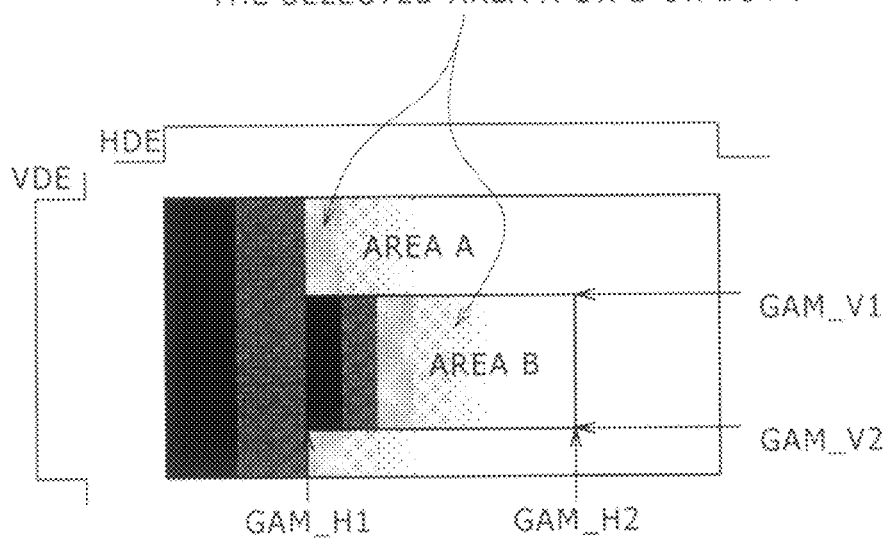
FIG. 11 is a schematic view explanatory of a fine control correction processing range applicable to embodiments of the present invention.
Figure 12:
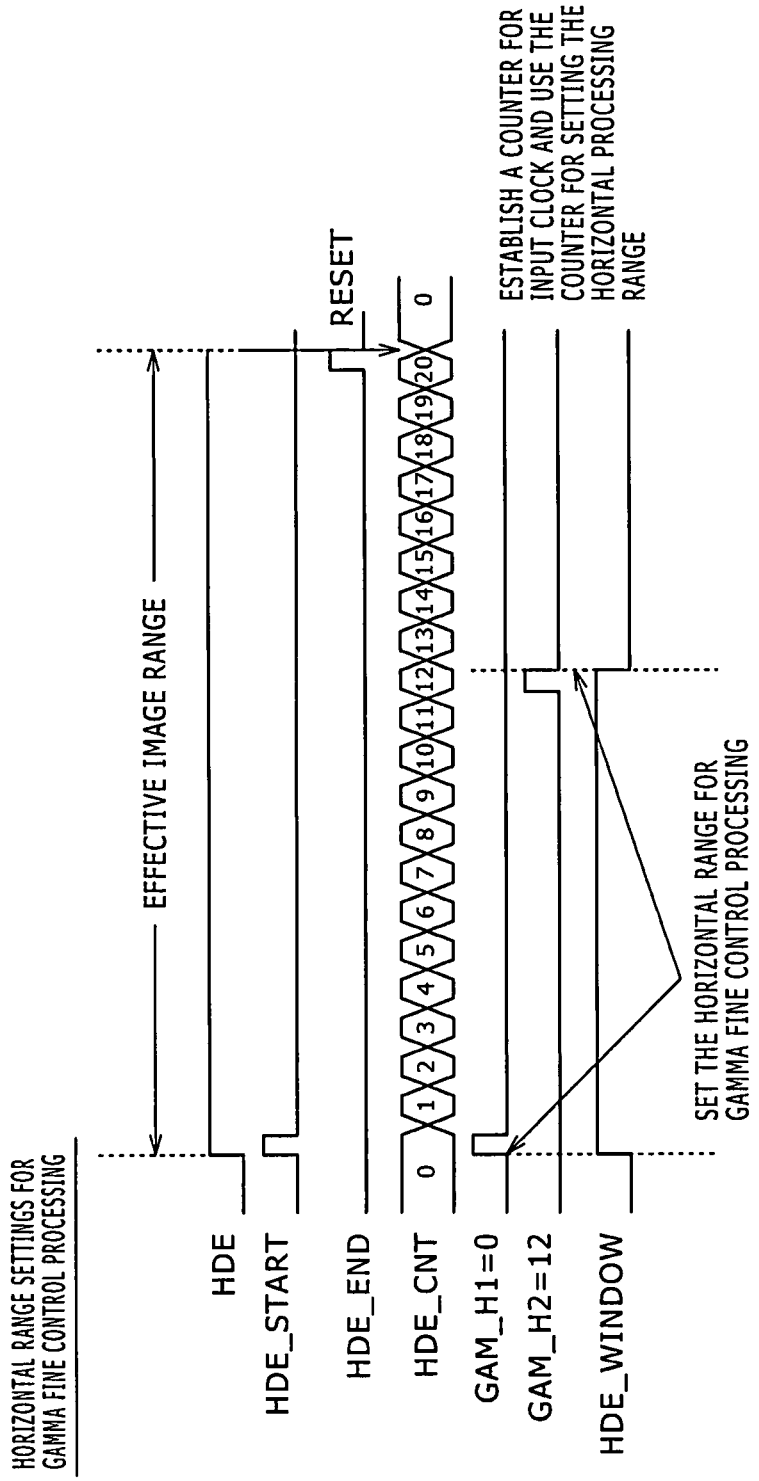
FIG. 12 is a timing chart in effect when the fine-control correction processing range applicable to embodiments of the present invention is designated in the horizontal direction.
Figure 13:
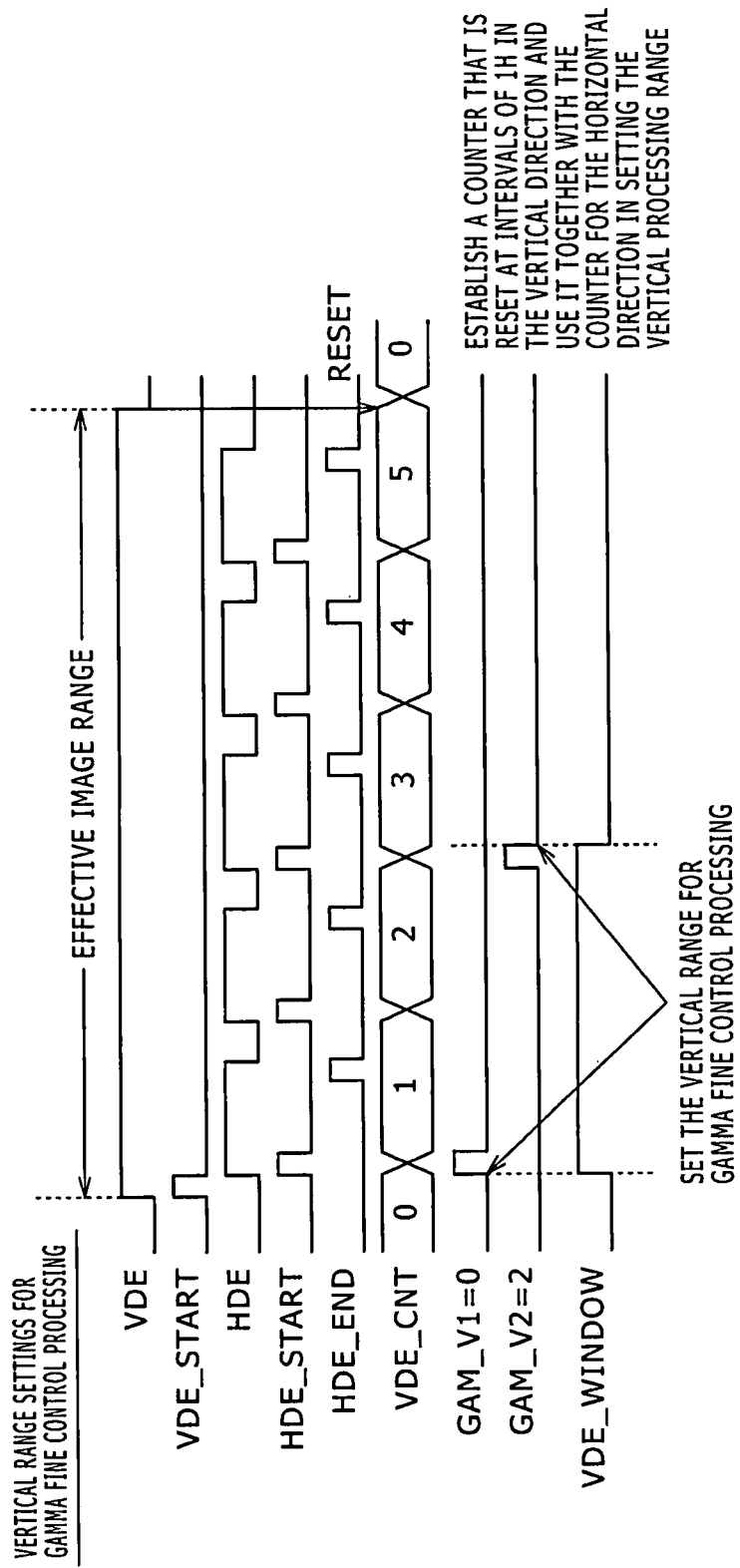
FIG. 13 is a timing chart in effect when the fine control correction processing range applicable to embodiments of the present invention is designated in the vertical direction.

FIG. 11 is a schematic view explanatory of the fine control correction processing range applicable to the embodiment of the present invention. FIG. 12 is a timing chart in effect when the fine control correction processing range applicable to the embodiment is designated in the horizontal direction. FIG. 13 is a timing chart in effect when the fine control correction processing range applicable to the embodiment is designated in the vertical direction.

As shown in FIG. 11, either a local area of which the correction is focused on a specific location, or the entire image display area may be selected as the correction (fine control) processing range, the selection being made by use of a processing range selection signal. When fine control correction is applied to the specific location, the range of interest is designated on a window display. Specifically, the range is designated by registers GAM_H1 and GAM_H2 in the horizontal direction and by registers GAM_V1 and GAM_V2 in the vertical direction.

As shown in FIGS. 12 and 13, the range to be processed may be designated in increments of dots or lines using the counters set for the horizontal and vertical directions within the effective image display area in response to the input clock.

Figure 14:
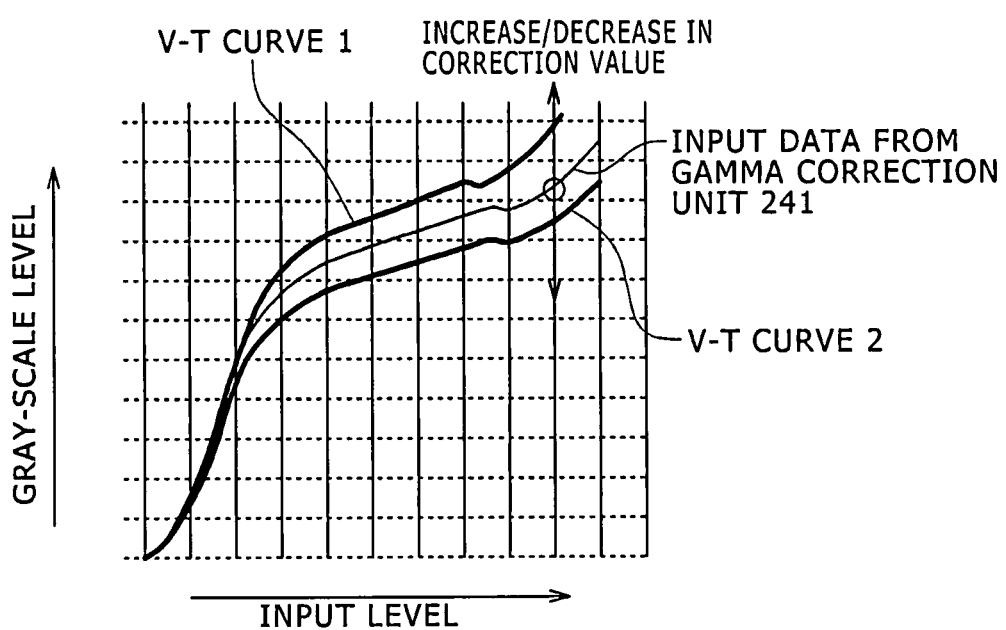
FIG. 14 is a graphic representation explanatory of how the inventive image processing apparatus can be arranged to adjust the V-T curve, with detailed conditions of a liquid crystal display unit taken into consideration.

When the range of interest is selected to be processed, this embodiment of the invention allows the correction data to be retrieved selectively from one of the banks BNK-1 through BNK-M for the screen area outside the designated range of the window display as shown in FIG. 14. This arrangement permits V-T curve control with more detailed conditions of the LCD unit taken into consideration.

Figure 15:
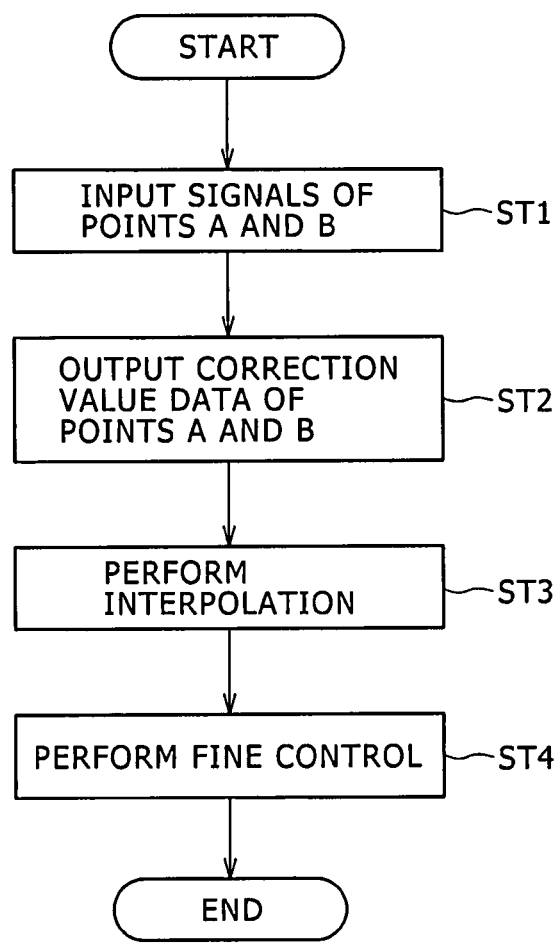
FIG. 15 is a flowchart outlining the typical workings of the gamma correction fine control circuit shown in FIG. 7.

FIG. 15 is a flowchart outlining the typical workings of the gamma correction fine control circuit shown in FIG. 7. Described below in reference to FIG. 15 is how the gamma correction fine control circuit 42 of the above-described structure typically operates. It is assumed that the signal gamma-corrected by the data selector 4216 is selected.

The memory 4214 is structured beforehand as a dual port memory having the memory capacity of 1024 words ($=2^{10}$) and equipped with two read ports. As such, the memory 4214 accommodates the gamma correction value data.

In step ST1 of FIG. 15, given an input signal, the addition and overflow processing unit 4211 inputs the correction-use bits of the high-order 10 bits from the input signal. The addition and overflow processing unit 4211 adds "1" to the tenth bit in the input bits to create further correction-use bits that are output to the memory 4214. The correction-use bits of the high-order 10 bits are placed unchanged into the memory 4214.

In step ST2, the memory 4214 admits through the appropriate address port the correction-use bits (for point A) of the high-order 10 bits from the input signal and the correction-use bits of the high-order 10 bit with "1" added to the tenth bit of the input signal output from the addition and overflow processing unit 4211 (for point B). The correction-use bits designate the addresses from which the correction value data is output to the interpolation computing unit 4215. Specifically, the correction value data corresponding to the correction-use bits for point A, along with the correction value data corresponding to the correction-use bits for point B, is output to the interpolation computing unit 4215.

In step ST3, the flip-flop 4213 holds the interpolation-use bits of the low-order two bits from the input signal and outputs the retained bits to the interpolation computing unit 4215 in a suitably timed manner. In turn, the interpolation computing unit 4215 carries out an interpolation process based on the correction value data for points A and B coming from the memory 4214, and on those interpolation-use bits of the low-order two bits from the input signal which are sent from the flip-flop 4213.

More specifically, because the number of quantization bits in the interpolation-use bits is two, the interpolation computing unit 4215 divides the interpolation value data between point A and point B into four segments as shown in FIG. 9. The interpolation computing unit 4215 proceeds to create interpolation value data about the quantization points resulting from the division (i.e., points at ¼, ½, and ¾ segments). Based on the interpolation-use bits of the low-order two bits, the interpolation computing unit 4215 selects the interpolation value data corresponding to the input signal out of the created correction value data and the correction value data for point A. In this case, the gamma characteristic of the LCD is indicated by a nonlinear function whereby the output signal always increase with regard to the input signal. Given that characteristic, the value at point A of the low signal level and the interpolation value data acquired earlier may be added up to find the gamma correction value data for the target input signal level.

The interpolation computing unit 4215 outputs the interpolated image signal to the immediately downstream component unit. The result of the processing by the interpolation computing unit 4215 is supplied to the fine control processing unit 422 through the data selector 4216.

In step ST4, the input signal having undergone correction by the gamma correction processing unit 421 and the established correction data are interpolated using a linear correction function. The result of the interpolation is added to or subtracted from the input signal.

More specifically, according to predetermined high-order bits of the input signal, the correction data corresponding to points A and B located on the nearby gray-scale level of the input signal data is read from the bank BNK designated by the bank select signal BSLT. The linear interpolation of IN [Z:0] *(A−B)/$2^{(Z+1)}$ is then carried out based on the correction data of points A and B and on the low-order bits (IN[Z:0]) remaining in the input signal minus its high-order bits used to read the correction data from the input signal.

The result of the computations is added to or subtracted from the input signal which in turn is clipped with overflow and underflow taken into consideration. The definitive result of the interpolation is provided in this manner.

As described above, the image processing apparatus 1 equipped with the gamma fine control processing capability according to the present invention illustratively creates correction values based on a look-up table (LUT) arrangement for correcting an input image signal in reference to the target gray-scale level corresponding to the V-T curve characteristic of the LCD unit in use. The correction value thus created is linearly interpolated by the gamma correction processing block furnished downstream.

The gray-scale correction data output by the gamma correction processing unit 421 is used as the reference corresponding to the characteristic of the LCD unit. For this reason, only one memory is needed to accommodate the LUT.

Because fine control correction data is handled by setting up registers, it is possible to prepare M kinds of fine control correction data in accordance with the number of banks, with regard to the input signal having undergone gray-scale correction. The preparation of the data is accomplished while only one memory is in use.

As opposed to traditional setups, the inventive arrangements reduce the time required to update the correction data in the LUT. Since only one memory is used, the circuits involved are structured in such a manner as to minimize any increase in the scale of circuitry or in power dissipation. It is also possible adjustably to deal with the V-T curve of an LCD unit deteriorated in performance over time. The embodiment of the invention thus allows more detailed display areas to be designated for data correction at more detailed gray-scale levels than before.

In other words, as many as M kinds of correction data are established with regard to each of fixed N gray-scale levels through the use of M banks and without recourse to multiple memories being included in the circuits. This prevents the increase in the level of circuitry or in power consumption.

Because the register settings of correction data are made for each of the banks BNK-1 through BNK-M without the need to update the entire gamma table data, the settings of gamma fine control data can be changed instantaneously. This makes it possible to update the data in the LUT with little time required for the updating process.

Additions and subtractions are made to and from the gamma-corrected signal. This feature makes it possible to perform fine control in keeping with fluctuations in the V-T curve caused by changes in the characteristics of the LCD unit.

The ranges to be corrected can be set as defined by the user. The effective image range and specifically established locations can thus be corrected.

The V-T curve can be finely corrected with regard to a particular location in the image display area or in accordance with a specific gray-scale level. Because the data having undergone gray-scale correction is further corrected by the inventive arrangements, it is easy to flexibly address any functional changes in the upstream gamma correction block.

The gamma correction processing unit 421 of the gamma correction fine control circuit 42 is not limited to the structure shown in FIG. 7. Any one of diverse types of gamma correction processing circuits may be adopted for the circuit instead.

Figure 16:
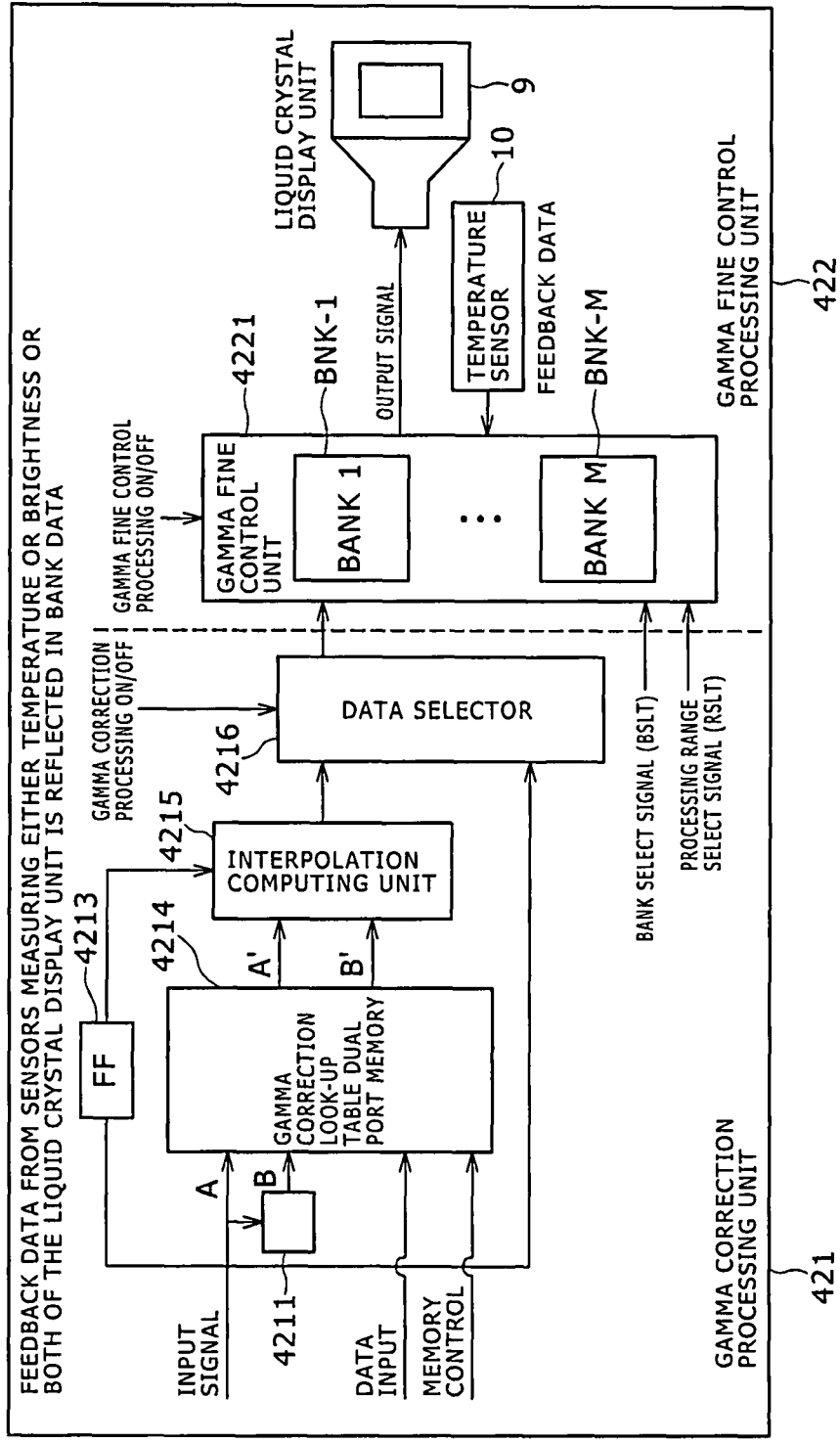
FIG. 16 is a function block diagram showing a typical structure of another gamma correction fine control circuit embodying the present invention.

FIG. 16 is a function block diagram showing a typical structure of another gamma correction fine control circuit according to one embodiment of the present invention. An image processing apparatus 1A in FIG. 16 differs from the image processing apparatus 1 in FIG. 1 in the following details. A temperature sensor 10 is furnished illustratively as a status information acquisition unit close to the display unit 9. Feedback data acquired by the temperature sensor 10 is detected illustratively by the microcomputer 8 as status information. In keeping with the temperature characteristic of the LCD unit acquired from the feedback data, the gamma fine control correction data is established beforehand in each of the banks BNK-1 through BNK-M; the established data is then accessed selectively and automatically. The selectively accessed correction data is used to carry out correction processes reflecting the temperature characteristic being in effect.

Other sensors may also be set up to generate feedback pulses whereby the gamma fine control correction data can be adjusted. In this manner, a specifically targeted correction method may be implemented in order to deal with a particular characteristic of the LCD unit.

Figure 17:
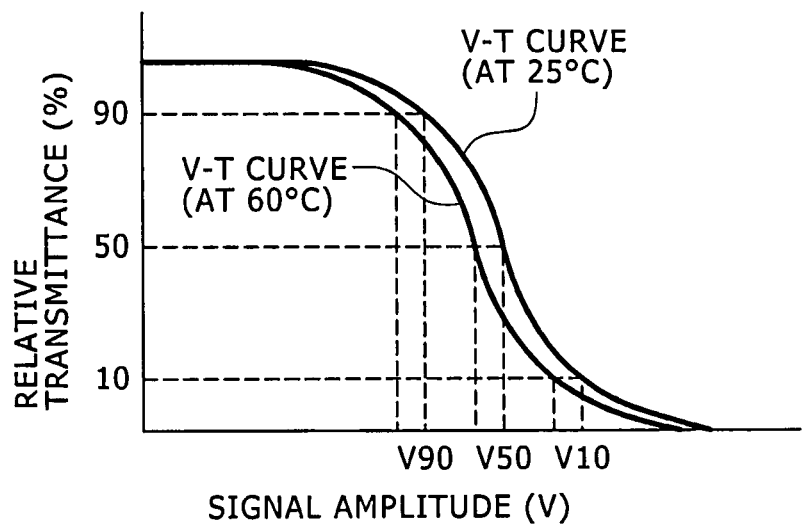
FIG. 17 is a graphic representation explanatory of the manner in which the V-T curve characteristic of a liquid crystal display unit is dependent on temperature.

The V-T curve characteristic of the LCD unit is also dependent on temperature, as illustrated in FIG. 17. With this embodiment, the temperature sensor is attached to the image processing apparatus 1A so as to detect the temperature thereof. The data thus detected is fed back to the gamma fine control processing unit 422. The gamma fine control correction data corresponding to the temperature characteristic of the LCD unit is selectively established beforehand in each of the banks BNK-1 through BNK-M constituting a register arrangement. When the temperature is detected, the acquired temperature data permits automatically revised access to one of the banks which contains the correction data corresponding to the current temperature characteristic of the LCD unit.

Besides the temperature sensor, a brightness sensor may be furnished as a status information acquisition unit. In this case, feedback data from the brightness sensor having sensed the brightness of the LCD unit is compared with the output data from the gamma fine control processing unit. The difference between the two kinds of data is used to update the contents of the applicable registers in the banks accommodating the gamma fine control correction data. This setup makes it possible to compensate for the V-T curve of the LCD unit deteriorated over time.

Figure 18:
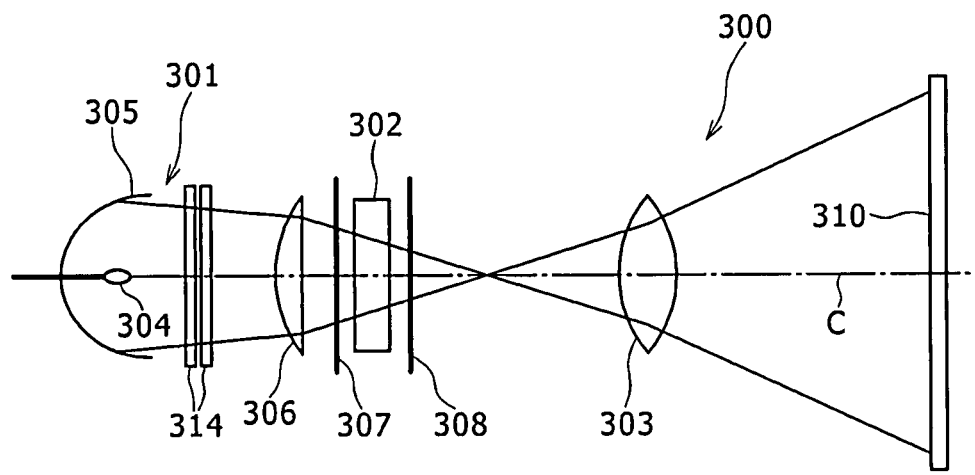
FIG. 18 is a schematic view showing a typical LCD projector unit according to one embodiment of the present invention.

As a typical electronic apparatus employing the above-described LCD unit, a projection type LCD unit will be described below in reference to the schematic view of FIG. 18 outlining a typical structure of the apparatus. As shown in FIG. 18, a projection type LCD unit (i.e., LCD projector unit) 300 is made up of a light source 301, a transmissible liquid crystal display (LCD) device 302, and an optical projection system 303, arranged in that order along an optical axis C.

A lamp 304 constituting the light source 301 emits light that is focused in the forward direction by a reflector 305. The focused light enters a condenser lens 306 which condenses the incident light. The condensed light is guided to the LCD device 302 through an incident-side deflecting plane 307.

The guided light is converted to images by means of the LCD device 302 and an emerging-side deflecting plate 308. The images resulting from the conversion are projected in an enlarged manner onto a screen 310 through the optical projection system 303. Filters 314 inserted between the light source 301 and the condenser lens 306 remove rays of unnecessary wavelengths (e.g., infrared rays and ultraviolet rays) from the emitted light.

Figure 19:
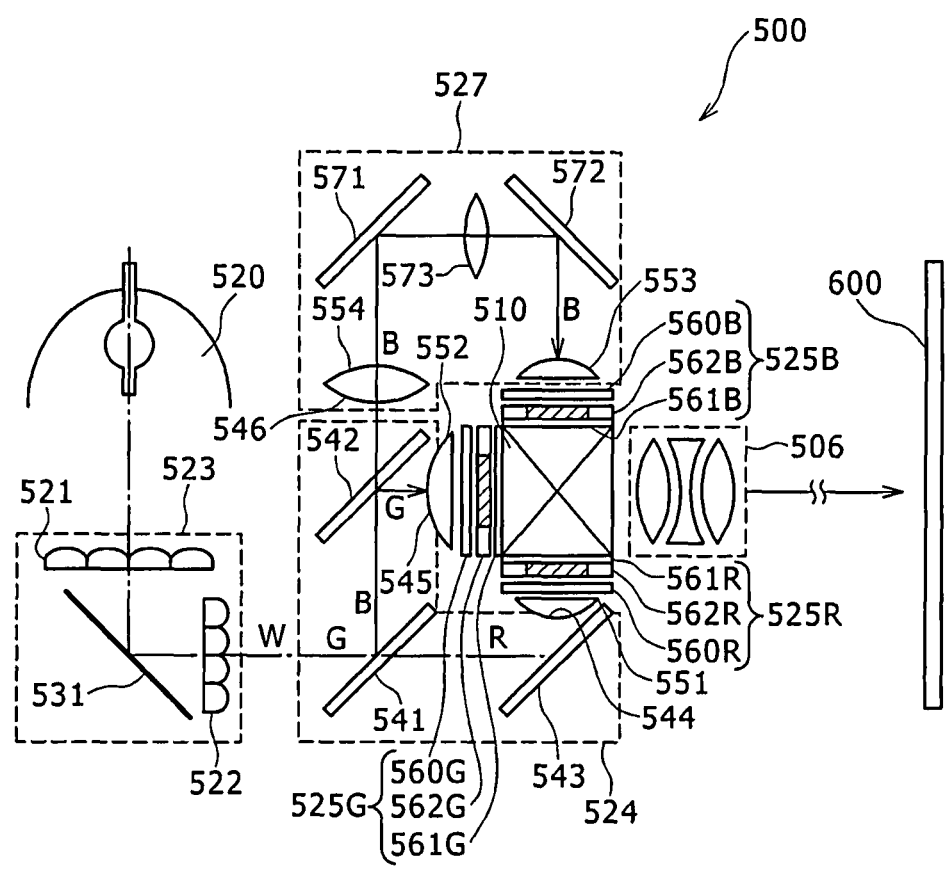
FIG. 19 is a detailed schematic diagram of a 3LCD projector unit embodying the present invention.

A typical structure of the projection type LCD unit practiced as an electrical apparatus adopting the above-described LCD device will be discussed below in reference to FIG. 19. A projection type LCD unit 500 shown in FIG. 19 utilizes three units of the above-described LCD device, i.e., LCD devices 562R, 562G and 562B provided for the R, G and B signals respectively and constituting the optical system of the projector unit.

As its light source, the optical system of the projection type LCD unit 500 employs a light source device 520 and a uniform illumination optical system 523. The LCD unit 500 also includes: a color separation optical system 524 that separates a light beam W coming from the uniform illumination optical system 523 into red (R), green (G) and blue (B) beams; three light valves 525R, 525G and 525B which modulate the three light beams R, G and B respectively; a color composition prism 510 that composes the modulated light beams into one beam; a projection lens unit 506 that projects in enlarged fashion the composed light beam onto the surface of a projection screen 600; and a light guidance system 527 that guides the blue light beam B to the corresponding light valve 525B.

The uniform illumination optical system 523 has two lens plates 521 and 522 and a reflecting mirror 531. The two lens plates 521 and 522 are positioned perpendicular to each other and in a manner flanking the reflecting mirror 531. Each of the lens plates 521 and 522 in the uniform illumination optical system 523 has a plurality of rectangular lenses laid out in a matrix pattern.

The light beam emitted by the light source device 520 is divided into a plurality of partial light beams by the rectangular lenses of the first lens plate 521. These partial light beams are focused by the rectangular lenses of the second lens plate 522 near the three light valves 525R, 525G and 525B. Thus even if the light source device 520 has an uneven illumination distribution across its emerging light beam, the uniform illumination optical system 525 in place can illuminate the three light valves 525R, 525G and 525B with the uniform light.

The color separation optical system 524 is made up of a blue-green reflecting dichroic mirror 541, a green reflecting dichroic mirror 542, and a reflecting mirror 543. The blue-green reflecting dichroic mirror 541 reflects the blue light beam B and green light beam G from the light beam W in the perpendicular direction. The reflected light beams are headed for the green reflecting dichroic mirror 542. The red light beam R passes through the blue-green reflecting dichroic mirror 541 before being reflected perpendicularly by the downstream reflecting mirror 543. From the mirror 543, the red light beam R reaches a red light beam emitter 544 which emits the light beam R to the prism unit 510.

The green reflecting dichroic mirror 542 orthogonally reflects only the green light beam G out of the blue light beam B and green light beam G reflected by the blue-green reflecting dichroic mirror 541. From the mirror 542, the green light beam G reaches a green light beam emitter 545 which emits the light beam G to the color composition prism. The blue light beam B having passed the green reflecting dichroic mirror 542 is forwarded by a blue light beam emitter 546 to the light guidance system 527.

The distance between the light beam (W) emitting edge of the uniform illumination optical system 523 and each of the three light beam emitters 544, 545 and 546 in the color separation optical system 524 is set to be substantially the same. Condenser lenses 551 and 552 are positioned on the light-emerging side of the red light beam emitter 544 and green light beam emitter 545, respectively, in the color separation optical system 524. The red light beam R and green light beam G coming out of the respective emitters enter the condenser lenses 551 and 552 to be rendered in parallel with each other.

The paralleled red light beam R and green light beam G enter the light valves 525R and 525G respectively for modulation processes. The color beams are furnished with corresponding image information through the modulation. That is, these LED devices are switched under control of driving means, not shown, in a manner reflecting the image information being supplied. The color light beams passing through the LED devices are modulated by them. The blue light beam B is guided through the light guidance system 527 to the corresponding light valve 525B which likewise modulates the blue light beam using the relevant image information.

The light valves 525R, 525G and 525B of this setup are liquid crystal light valves containing incident-side deflecting plates 561R, 561G and 561B flanked on one side by the LCD devices 562R, 562G and 562B, respectively.

The light guidance system 527 is constituted by a condenser lens 554 positioned on the emerging-side of the blue light beam (B) emitter 546, by an incident-side reflecting mirror 571, by an emerging-side reflecting mirror 572, by an intermediate lens 573 located between the two reflecting mirrors, and by a condenser lens 553 positioned upstream of the light valve 525B.

The blue light beam emitted by the condenser lens 546 is guided through the light guidance system 527 to the LED device 562B for modulation by the latter. Among the optical paths of the different color light beams ranging from the emitter edge of the light beam W to the different LCD devices 562R, 562G and 562B, the optical path of the blue light beam B has the longest distance. That means the loss in the quantity of light is the largest for the blue light beam.

However, the light guidance system 527 is provided to help reduce the loss in light quantity. The color light beams R, G and B modulated during passage through the light valves 525R, 525G and 525B respectively enter the color composition prism 510 for color composition. The light beam composed by the prim 510 is forwarded to the projection lens unit 506 which in turn projects, in an enlarged manner, the composed light beam onto the surface of the suitably positioned projection screen 600.

The present invention can be applied not only to the projection type LCD unit but also to reflection type LCD units, LCOS (liquid crystal on silicon), organic electroluminescent displays, and apparatuses of other display methods. The above-described effects of the present invention are also available when the invention is applied to LCD devices with built-in driver circuits, LCD devices with external driver circuits, LED devices of diverse sizes ranging illustratively from one to 15 inches or more in diagonal length, and LCD devices of various types including simple matrix liquid crystal type, TFD active matrix type, passive matrix type, optically active mode type, and birefringence mode type.

It should be understood by those skilled in the art that various modifications, combinations, sub-combinations and alterations may occur depending on design requirements and other factor in so far as they are within the scope of the appended claims or the equivalents thereof.

What is claimed is:

1. An image processing apparatus for carrying out correction processing on an image signal made up of a plurality of bits, said image processing apparatus comprising:
    a correction processing unit configured to perform gamma correction on an input image signal; and
    a fine control processing unit configured to establish a plurality of types of correction data in accordance with a plurality of fixed gray-scale levels of the input signal in order to fine-control a voltage-transmittance (V-T) curve, corresponding to an applied voltage by performing computations on said input image signal gamma-corrected by said correction processing unit using the established correction data, wherein said fine control processing unit has banks of rewritable electronic memory elements configured to retain said correction data and the fine control processing unit is selectively operated in response to control signals and further wherein an input signal corrected by gamma correction processing and established correction data are interpolated and the interpolation result is added or subtracted from the input signal and further wherein at least some higher order signal data bits are used for signal correction processing and only lower order data bits are used for signal interpolation such that interpolation value data corresponds to low-order interpolation-use bits and the fine control processing unit receives a bank select signal and a processing range select signal for determining which electronic memory should be used and a determined range for processing.

2. The image processing apparatus according to claim 1, further comprising
    a unit configured to let a user define an effective image range and a fine-control correction processing range of a particular location for said fine control processing unit.

3. The image processing apparatus according to claim 1, wherein said fine control processing unit fine-controls said V-T curve with regard to either a particular location of a screen display area or a specific gray-scale level.

4. The image processing apparatus according to claim 2, wherein said fine control processing unit fine-controls said V-T curve with regard to either a particular location of a screen display area or a specific gray-scale level.

5. The image processing apparatus according to claim 1, and
    wherein said fine control processing unit reads from designated banks the correction data corresponding to two points located at nearby gray-scale levels of given data in accordance with predetermined high-order bits of said input signal, performs linear interpolation processing based on said correction data about said two points and on low-order bits of said input signal other than said high-order bits used to read said correction data from said input signal, and performs computations to either add an outcome of said linear interpolation to said input signal or to subtract said outcome from said input signal.

6. The image processing apparatus according to claim 5, wherein said fine control processing unit performs clipping with an overflow and an underflow taken into consideration following said computations.

7. The image processing apparatus according to claim 1, wherein said correction processing unit includes:
    a memory configured to store look-up table type gamma correction data computed in keeping with said V-T curve characteristic of said image processing apparatus; and
    a selector configured to select either the gamma-corrected signal or a gamma-uncorrected signal.

8. The image processing apparatus according to claim 1, further comprising:
    an acquisition unit configured to acquire status information about said image processing apparatus; and
    a unit configured to either select or update data automatically by receiving said status information acquired by said acquisition unit, by supplementing said status information with the V-T characteristic to create feedback data, and by having said feedback data reflected in said correction data inside said fine control processing unit.

9. The image processing apparatus according to claim 5, further comprising:
    an acquisition unit configured to acquire status information about said image processing apparatus; and
    a unit configured to either select or update data automatically by receiving said status information acquired by said acquisition unit, by supplementing said status information with the V-T characteristic to create feedback data, and by having said feedback data reflected in said correction data inside said fine control processing unit.

10. An image processing method for carrying out correction processing on an image signal Made up of a plurality of bits, said image processing method-comprising
    performing gamma correction on an input image signal by establishing as desired a plurality of types of correction data in accordance with a plurality of fixed gray-scale levels of the input signal; and
    fine-controlling a voltage-transmittance (V-T) curve, corresponding to an applied voltage by performing computations on the signal gamma-corrected using the established correction data, wherein said fine control processing employs banks of rewritable electronic memory elements configured to retain said correction data and the fine control processing is selectively performed in response to control signals and further wherein an input signal corrected by gamma correction processing and established correction data are interpolated and the interpolation result is added or subtracted from the input signal and further wherein at least some higher order signal data bits are used for signal correction processing and only lower order data bits are used for signal interpolation such that interpolation value data corresponds to low-order interpolation-use bits and the fine control processing unit receives a bank select signal and a processing range select signal for determining which electronic memory should be used and a determined range for processing.

11. The image processing method according to claim 10, further comprising
    the step of letting a user define an effective image range and a fine-control correction processing range of a particular location.

12. The image processing method according to claim 10, wherein said V-T curve is fine controlled with regard to either a particular location of a screen display area or a specific gray-scale level.

13. The image processing method according to claim 10, and
wherein fine control is based on reading from designated banks the correction data corresponding to two points located at nearby gray-scale levels of given data in accordance with predetermined high-order bits of said input signal, performs linear interpolation processing based on said correction data about said two points and on low-order bits of said input signal other than said high-order bits used to read said correction data from sand input signal, and performs computations to either add an outcome of said linear interpolation to said input signal or to subtract said outcome from said input signal.

14. A display apparatus including an image processing apparatus for carrying out correction processing on an image signal made up of a plurality of bits, said image processing apparatus comprising:
a correction processing unit configured to perform gamma correction on an input image signal; and
a fine control processing unit configured to establish a plurality of types of correction data in accordance with a plurality of fixed gray-scale levels of the input signal in order to fine-control a voltage-transmittance (V-T) curve, corresponding to an applied voltage by performing computations on said input image signal gamma-corrected by said correction processing unit using the established correction data, wherein said fine control processing unit has banks of rewritable electronic memory elements configured to retain said correction data and the fine control processing unit is selectively operated in response to control signals and further wherein an input signal corrected by gamma correction processing and established correction data are interpolated and the interpolation result is added or subtracted from the input signal and further wherein at least some higher order signal data bits are used for signal correction processing and only lower order data bits are used for signal interpolation such that interpolation value data corresponds to low-order interpolation-use bits and the fine control processing unit receives a bank select signal and a processing range select signal for determining which electronic memory should be used and a determined range for processing.

15. A projection display apparatus comprising:
a light source;
at least one liquid crystal display unit including an image processing apparatus for carrying out correction processing on an image signal made up of a plurality of bits;
a light focusing system configured to focus light emitted by said light source onto said liquid crystal display unit; and
an optical projection system configured to expand the light optically modulated by said liquid crystal display unit for projection purposes,
wherein said image processing apparatus in said liquid crystal display unit includes
a correction processing unit configured to perform gamma correction on an input image signal, and
a fine control processing unit configured to establish a plurality of types of correction data in accordance with a plurality of fixed gray-scale levels of the input signal in order to fine-control a voltage-transmittance (V-T) curve, corresponding to an applied voltage by performing computations on said input image signal gamma-corrected by said correction processing unit using the established correction data, wherein said fine control processing unit has banks of rewritable electronic memory elements configured to retain said correction data and the fine control processing unit is selectively operated in response to control signals and further wherein an input signal corrected by gamma correction processing and established correction data are interpolated and the interpolation result is added or subtracted from the input signal and further wherein at least some higher order signal data bits are used for signal correction processing and only lower order data bits are used for signal interpolation such that interpolation value data corresponds to low-order interpolation-use bits and the fine control processing unit receives a bank select signal and a processing range select signal for determining which electronic memory should be used and a determined range for processing.

16. An image processing apparatus for carrying out correction processing on an image signal made up of a plurality of bits, said image processing apparatus comprising:
a correction processing means for performing gamma correction on an input image signal; and
a fine control processing means for establishing a plurality of types of correction data in accordance with a plurality of fixed gray-scale levels of the input signal in order to fine-control a voltage-transmittance (V-T) curve, corresponding to an applied voltage by performing computations on said input image signal gamma-corrected by said correction processing means using the established correction data, wherein said fine control processing unit has banks of rewritable electronic memory elements configured to retain said correction data and the fine control processing unit is selectively operated in response to control signals and further wherein an input signal corrected by gamma correction processing and established correction data are interpolated and the interpolation result is added or subtracted from the input signal and further wherein at least some higher order signal data bits are used for signal correction processing and only lower order data bits are used for signal interpolation such that interpolation value data corresponds to low-order interpolation-use bits and the fine control processing unit receives a bank select signal and a processing range select signal for determining which electronic memory should be used and a determined range for processing.

17. A display apparatus including an image processing apparatus for carrying out correction processing on an image signal made up of a plurality of bits, said image processing apparatus comprising:
a correction processing means for performing gamma correction on an input image signal; and
a fine control processing means for establishing a plurality of types of correction data in accordance with a plurality of fixed gray-scale levels of the input signal in order to fine control a voltage-transmittance (V-T) curve, corresponding to an applied voltage by performing computations on said input image signal gamma-corrected by said correction processing means using the established correction data, wherein said fine control processing unit has banks of rewritable electronic memory elements configured to retain said correction data and the fine control processing unit is selectively operated in response to control signals and further wherein an input signal corrected by gamma correction processing and established correction data are interpolated and the interpolation result is added or subtracted from the input signal and further wherein at least some higher order signal data bits are used for signal correction processing and only lower order data bits are used for signal interpolation such that interpolation value data corresponds to low-order interpolation-use bits and the fine control processing unit receives a bank select signal and a processing range select signal for determining which electronic memory should be used and a determined range for processing.

18. The image processing apparatus according to claim 1, wherein feedback data from sensors measuring temperature and/or brightness is stored in the banks of rewritable electronic memory elements.

19. The image processing method according to claim 10, wherein feedback data from sensors measuring temperature and/or brightness is stored in the banks of rewritable electronic memory elements.

20. The image processing method according to claim 14, wherein feedback data from sensors measuring temperature and/or brightness is stored in the banks of rewritable electronic memory elements.

* * * * *